(12) United States Patent
Sakurai

(10) Patent No.: US 7,830,419 B2
(45) Date of Patent: Nov. 9, 2010

(54) DIGITAL CAMERA, GAIN-COMPUTING DEVICE AND METHOD

(75) Inventor: Junzou Sakurai, Tokyo (JP)

(73) Assignee: Eastman Kodak Company, Rochester, NY (US)

( * ) Notice: Subject to any disclaimer, the term of this patent is extended or adjusted under 35 U.S.C. 154(b) by 830 days.

(21) Appl. No.: 11/425,223

(22) Filed: Jun. 20, 2006

(65) Prior Publication Data

US 2007/0139532 A1  Jun. 21, 2007

(30) Foreign Application Priority Data

Dec. 19, 2005 (JP) ............................. 2005-364816

(51) Int. Cl.
*H04N 9/73* (2006.01)
(52) U.S. Cl. ................................ 348/223.1; 348/224.1
(58) Field of Classification Search .............. 348/226.1, 348/224.1, 223.1
See application file for complete search history.

(56) References Cited

U.S. PATENT DOCUMENTS

| | | | | |
|---|---|---|---|---|
| 5,808,681 A | * | 9/1998 | Kitajima | ..................... 348/371 |
| 7,286,703 B2 | * | 10/2007 | Kaku | ......................... 382/167 |
| 7,505,069 B2 | * | 3/2009 | Wang | ....................... 348/223.1 |
| 2004/0001153 A1 | * | 1/2004 | Kikukawa et al. | ......... 348/226.1 |
| 2004/0095478 A1 | * | 5/2004 | Takano et al. | ............. 348/223.1 |
| 2006/0044422 A1 | * | 3/2006 | Miyazaki | ..................... 348/234 |
| 2006/0176379 A1 | * | 8/2006 | Hyodo | ..................... 348/223.1 |

FOREIGN PATENT DOCUMENTS

| | | |
|---|---|---|
| JP | 2001-112019 | 4/2001 |
| JP | 2003-309854 | 10/2003 |

* cited by examiner

*Primary Examiner*—David L Ometz
*Assistant Examiner*—Antoinette T Spinks
(74) *Attorney, Agent, or Firm*—Pamela R. Crocker; Peyton C. Watkins

(57) ABSTRACT

To determine a more appropriate WB gain. A first image data, which is obtained by way of photographing essentially the same subject as that of a main image intended by a user without firing a strobe light for preliminary illumination, and a second image data, which is obtained by way of photographing the same while firing the strobe light for preliminary illumination, are captured. Subsequently, a typical value of each of blocks constituting the first and second image data and the type of a light source of the same are acquired as block information. The thus-acquired pieces of block information about the first and second image data are compared with each other, to thus acquire the tendency of a color change in subject before and after preliminary illumination. An environment light source is estimated on the basis of the obtained tendency of a color change.

15 Claims, 19 Drawing Sheets

SECOND IMAGE

FIRST IMAGE

DIGITAL CAMERA, GAIN-COMPUTING DEVICE AND METHOD

FIELD OF THE INVENTION

The present invention relates to a digital camera which subjects a main image, or an intended captured image of the user, to white balance processing; as well as to a gain-computing device and a gain-computing method for computing a white balance gain used for white balance processing.

BACKGROUND OF THE INVENTION

Even when the color temperature of the environment light source varies, a digital camera always performs white balance (WB) processing for making a correction so as to accurately photograph a white article. WB processing includes manual white balance (MWB) processing by means of which the user specifies the type of the environment light source, and automatic white balance (AWB) processing by means of which a camera automatically determines the type of the environment light source. Of these two types of processing, AWB processing includes the steps of dividing a captured image into a plurality of blocks; computing a typical color value of a plurality of pixels constituting each of the blocks; and determining the type of the light source for each of the blocks on the basis of the typical color value. Thus, the environment light source is estimated on the basis of the number of the blocks for each type of light source.

In AWB processing, accurate estimation of the environment light source is indispensable for appropriately effecting white balance processing. To this end, a plurality of techniques for accurately estimating the environment light source (the color of the environment light source) have hitherto been proposed.

For instance, Japanese Patent Publication 2003-309854 describes a technique of accurately estimating, during stroboscopic photographing, the influence of a flash of light on a subject and the influence of fixed light on the subject, and, by extension, the color of the environment light source. According to the technique described in Japanese Patent Publication 2003-309854, preliminary light emission image data pertaining to images acquired by means of preliminarily firing light and comparison image data pertaining to images captured without preliminary firing light are acquired prior to actual photographing. The influence of a flash of light on a subject and the influence of fixed light on the same are determined on the basis of the amount of change between the brightness value of the preliminary light emission image data and that of the comparison image data, as well as on the basis of the degree of influence of preliminary emission of light which affects a brightness value. In consideration of the results of determination, an actually-photographed image is subjected to WB processing.

Japanese Patent Publication 2001-112019 describes a technique of, at the time of determination of a light source of each of blocks (or a block), determining a distance between the typical color difference of an estimated light source, such as a fluorescent lamp or daylight and typical color-difference components of the respective blocks, to thereby determine, from the distance, reliability at which the block is illuminated by the estimated light source. On the basis of the thus-obtained reliability, the typical color difference, and the like, the color of illumination light for the scene of an image (i.e., the color of the environment light source) is determined, and white balance adjustment is performed so as to cancel the color of illumination light. By means of cancellation, an appropriate white balance can be performed more stably.

Incidentally, the color of a white article acquired under a certain type of light source and the color of a colored article acquired under another type of light source are known to be analogous to each other. Put another way, presence of a color range where an erroneous determination of the light source is likely to arise is known. For instance, the color of a green-colored article (e.g., leaves of a plant or the like) acquired under daylight is known to be similar to the color of a white article acquired under fluorescent light. Consequently, when a subject principally occupied by a green article is photographed under daylight, the type of the light source of a block corresponding to the green article is erroneously determined as "fluorescent light." As a consequence, there may arise a case where the environment light source for all the photographed images is erroneously determined.

In the related-art technique, a color range, where erroneous determination of a light source is likely to arise, is not taken into consideration. Therefore, when the subject has a color which is likely to cause erroneous determination of the light source, an erroneous determination of the environment light source arises, which in turn results in a case where appropriate WB processing cannot be performed.

SUMMARY OF THE INVENTION

The present invention provides a digital camera which can perform appropriate WB processing regardless of the color of the subject, as well as providing a gain-computing device and a gain-computing method for computing a WB gain used in WB processing.

The present invention provides a digital camera for subjecting a main image, which is a user's intended captured image, to white balance processing, the camera comprising:

first image acquisition means for acquiring a first image data by means of capturing a subject image identical with that of the main image, without firing a strobe light for preliminary illumination;

second image acquisition means for acquiring a second image data by means of capturing a subject image identical with that of the main image while firing a strobe light for preliminary illumination;

color change tendency acquisition means for acquiring a tendency of a color change in the subject induced by preliminary illumination, on the basis of the first and second image data;

environment light source estimation means for estimating an environment light source of the subject on the basis of at least the acquired tendency of a color change; and gain-computing means for computing a white balance gain of the main image in accordance with the estimated environment light source.

The color change tendency acquisition means preferably has block information acquisition means which divides each of the first and second image data into a plurality of blocks and acquires, as block information, a typical color value of each of the blocks and the type of a light source of each of the blocks, and acquires the tendency of a color change on the basis of a comparison between the acquired block information about the first image data and the acquired block information about the second image data. In this case, the color change tendency acquisition means desirably acquires, as the tendency of a color change, proportions of number of blocks where the types of the light sources have changed between the first and second image data and the types of the light sources acquired before and after occurrence of the changes. Further, the color change tendency acquisition means desirably acquires, as the tendency of a color change, amounts of changes between the first and second image data in connection with the typical value of a block at identical coordinates. Moreover, the color change tendency acquisition means desirably acquires, as the tendency of a color change, a difference in the number of blocks between the first and second image data for each light source type.

In another preferred aspect, the digital camera preferably further comprises means for determining whether or not a strobe light has been mainly illuminated during capture of a main image, wherein, when the strobe light is determined to have been mainly illuminated, the environment light source estimation means estimates an environment light source for nonillumination on the basis of the tendency of a color change; determines a mixing ratio of the environment light source acquired during nonillumination to the strobe light fired for main illumination; and estimates an environment light source employed during acquisition of a main image on the basis of the obtained mixing ratio and the environment light source used during nonillumination.

In yet another preferred aspect, the environment light source estimation means has degree-of-influence acquisition means for determining the degree of influence of preliminary illumination on a subject; and an environment light source is estimated on the basis of an acquired degree of influence and the tendency of a color change. In this case, the degree-of-influence acquisition means preferably determines a degree of influence of preliminary illumination on the basis of a proportion between the brightness of the subject and brightness of preliminary illumination in the subject. Further, the degree-of-influence acquisition means desirably determines the degree of influence of preliminary illumination on the basis of at least amounts of changes in brightness value between the first and second image data.

When the degree of influence of preliminary illumination is less than a predetermined reference value, the environment light source estimation means preferably estimates a tentative environment light source on the basis of the tendency of a color change; determines weighting coefficients of respective types of light sources on the basis of the obtained tentative environment light source; divides a main image into a plurality of blocks; determines a typical color value of each of the blocks and a type of light source of each of the blocks; and estimates an environment light source on the basis of a value which has been determined by multiplying the number of blocks in the main image for each of the types of the light sources by the weighting coefficient responsive to the type of the light source.

In yet another preferred aspect, when the degree of influence of preliminary illumination falls below a predetermined reference value, the environment light source estimation means preferably estimates a tentative environment light source on the basis of the tendency of a color change; sets an area, which is determined by removing areas where a light source is likely to be erroneously determined, as a white-colored article color range achieved under a light source differing from the tentative environment light source; divides a main image into a plurality of blocks; determines a type of a light source of each of the blocks on the basis of the set white-colored article color range; and estimates an environment light source on the basis of a result of determination of a light source type made for each of the blocks.

In another preferred aspect, the digital camera further comprises second image data necessity determination means for determining whether or not acquiring a second image data is necessary; and, when acquiring a second image data is determined to be unnecessary, acquiring a second image data and acquiring the tendency of a color change are not performed; and the environment light source estimation means estimates an environment light source on the basis of a main image.

The second image data necessity determination means preferably determines whether or not acquiring a second image data is necessary, on the basis of at least firing/nonfiring of a strobe light for illumination during capture of a main image. Moreover, the second image data necessity determination means preferably determines whether or not acquiring a second image data is necessary, on the basis of at least proportions of color areas, included in the first image data, where a light source is likely to be erroneously determined. Further, the second image data necessity determination means preferably determines whether or not acquiring a second image data is necessary, on the basis of the degree of influence of preliminary illumination on the subject.

In still another preferred aspect, the first image data and the second image data correspond to a preview image displayed on an electronic finder as a photographable image.

The present invention also provides a gain-computing device for computing a gain used for white balance processing to which a main image, which is a user's intended captured image, is subjected, the device comprising:

color change tendency acquisition means for acquiring a tendency of a color change in a subject induced by preliminary illumination, on the basis of a first image data captured by means of capturing a subject image identical with that of the main image without firing a strobe light for preliminary illumination and a second image data captured by means of capturing a subject image identical with that of the main image while firing a strobe light for preliminary illumination;

environment light source estimation means for estimating an environment light source of the subject on the basis of at least the acquired tendency of a color change; and gain-computing means for computing a white balance gain of the main image in accordance with the estimated environment light source.

The present invention further provides a gain-computing method for computing a gain used for white balance processing to which a main image, which is a user's intended captured image, is subjected, the method comprising:

a first image acquisition step of acquiring a first image data by means of capturing a subject image identical with that of the main image, without firing a strobe light for preliminary illumination;

a second image acquisition step of acquiring a second image data by means of capturing a subject image identical with that of the main image while firing a strobe light for preliminary illumination;

a color change tendency acquisition step of acquiring a tendency of a color change in the subject induced by preliminary illumination, on the basis of the first and second image data;

an environment light source estimation step of estimating an environment light source of the subject on the basis of at least the acquired tendency of a color change; and a gain-computing step of computing a white balance gain of the main image in accordance with the estimated environment light source.

Here, the term "estimating an environment light source" encompasses estimating a color range of an environment light source and white-colored article color range achieved under a light source which is of the same type as that of the environment light source, as well as encompassing estimating the type of a light source such as "fluorescent light" or "daylight."

In the present invention, the tendency of a color change in the subject stemming from preliminary illumination is acquired, and an environment light source of a main image is estimated in consideration of the tendency of a color change. Consequently, regardless of the original color of a subject, estimation of an accurate environment light source, as well as computation of an appropriate WB gain, can be performed.

The invention will be more clearly comprehended by reference to the embodiments provided below. However, the scope of the invention is not limited to these embodiments.

BRIEF DESCRIPTION OF THE DRAWINGS

Preferred embodiments of the present invention will be described in detail based on the following figures, wherein:

FIG. 10 is a view for describing an example mode for acquiring the tendency of a color change;

FIG. 11 is a view for describing the example mode for acquiring the tendency of a color change;

DETAILED DESCRIPTION OF THE PREFERRED EMBODIMENTS

Figure 1:
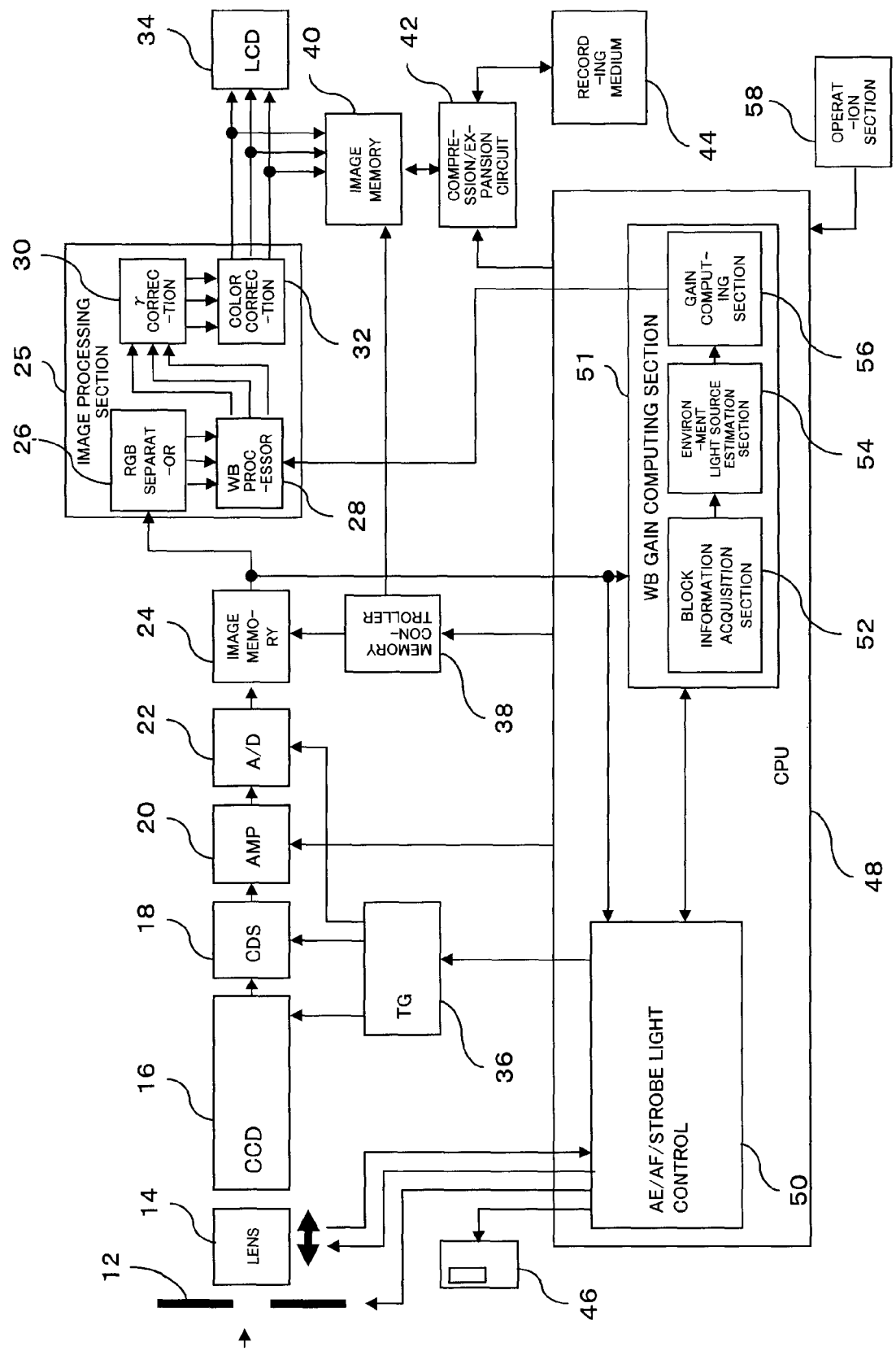
FIG. 1 is a block diagram showing the configuration of a digital camera which is a first embodiment of the present invention.

Embodiments of the present invention will be described hereinbelow by reference to the drawings. FIG. 1 is a block diagram showing the configuration of a digital camera 10 which is a first embodiment of the present invention. As in the case of an ordinary digital camera, the digital camera 10 has an automatic WB function for estimating the type of the environment light source (or the color temperature of the environment light source) acquired during photographing of an image, and computing a white balance (hereinafter abbreviated as "WB") gain responsive to an estimated environment light source. According to conventional automatic WB processing, an environment light source is estimated on the basis of captured image data. However, as will be described in detail later, when the environment light source is estimated on the basis of the captured image data, there may be a case where an erroneous estimation is made depending on the color of a subject. The digital camera of the present embodiment is configured to be able to prevent erroneous estimation of an environment light source, as well as computation of an inappropriate WB gain. Specifically, in the present embodiment, an image is preliminarily photographed twice prior to photographing of an image intended by the user (hereinafter called an "main image"), and an environment light source is estimated on the basis of the thus-acquired two preliminary images. The two preliminary images include a first image data obtained by photographing the same subject where a main image exists without firing a strobe light; and a second image data obtained by photographing the same subject where the main image exists while firing a strobe light. On the basis of a comparison between the first and second image data, there is acquired the tendency of a color change in a subject acquired before firing of a strobe light and after firing of a strobe light. The environment light source is estimated on the basis of the tendency of a color change. The configuration of this digital camera 10 will be described in detail hereinbelow.

Light of a subject (hereinafter simply called "FSS light") having entered the digital camera by way of a diaphragm member 12 and a lens 14 comes into focus on a CCD 16, which is an imaging device. A CPU 48 controls the size of the opening of the diaphragm member 12 and the travel distance of the lens 14. The CCD 16 converts the input FSS light into an electrical signal, and outputs the converted electric signal as captured image data. The timing of photoelectric conversion of the CCD 16 is controlled by the CPU 48 by way of a timing generator (TG) 36. The CCD 16 usually performs accumulation and sweeping of electric charges at a given time interval in order to acquire a preview image to be displayed on an LCD 34. When a photographing command has been issued by the user, the photoelectric conversion for acquiring a preview image is temporarily suspended. Electric charges are accumulated for an exposure period required to photograph a main image, and then the electric charges are swept.

The electrical signal output from the CCD 16 is subjected to predetermined analog signal processing performed by a double correction sampling circuit (CDS) 18 and amplifying processing performed by an amplifying circuit (AMP) 20. Subsequently, the signal is converted into digital data by means of an analog-to-digital (A/D) converter 22. The digital data are temporarily stored in image memory 24 as image data.

The image data temporarily stored in the image memory 24 are output to an image processing section 25 and a WB gain acquisition section 51. The image processing section 25 separates the image data into three color components; namely, an R (red) component, a G (green) component, and a B (blue) component, by means of an RGB separation section 26. The thus-separated data are sequentially sent to a WB processing section 28, a γ correction section 30, and a color correction section 32, where the data are subjected to predetermined image processing. Of these sections, the WB processing section 28 performs WB processing by means of multiplying three types of WB gains computed by the WB gain acquisition section 51; namely, an R (red) gain, a G (green) gain, and a B (blue) gain, by corresponding sets of color component data.

The image data, which have undergone image processing, are output to the LCD 34 and image memory 40. The LCD 34 electrically displays the image data that have been subjected to image processing. The image data appearing on the LCD 34 include a preview image and a photographed image recorded in a recording medium 44 to be described later. While displaying the preview image, the LCD 34 acts as an electronic finder showing a photographable image in a subject. While displaying the photographed image recorded in the recording medium 44, the LCD 34 acts as a playback monitor for playing photographed images.

The image data, which have been temporarily stored in the image memory 40, are subjected to compression processing performed by a compression-and-expansion circuit 42, and the thus-processed image data are recorded on the recording medium 44. Pursuant to a command from the user, the compression-and-expansion circuit 42 subjects the image data recorded on the recording medium 44 to expansion processing, and the thus-processed image data are displayed on the LCD 34. The user views the display on the LCD 34, to thus be able to ascertain contents of the photographed image. Memory controller 38 controls two image memories 24, 40.

A strobe 46 is a device for firing a strobe light toward a subject. The strobe 46 of the present embodiment employs a xenon bulb as a light source, and a color temperature of the light emitted from the xenon bulb is about 6500K. An AE/AF/strobe control section 50 controls firing timing and the quantity of a flash of light from the strobe 46.

The strobe light is fired in order to compensate for a deficiency in the quantity of light in the subject. In the present embodiment, a strobe light is fired at the time of acquisition of a second image data, which is a reference image used for estimating an environment light source, as well as for compensating for a deficiency in the quantity of light. As will be described in detail later, in the present embodiment, preliminary photographing is performed twice prior to actual photographing in order to estimate an accurate environment light source as well as to compute an appropriate AWB gain. First preliminary photographing is performed without firing a strobe light, and a second preliminary photographing is performed while firing a strobe light. The first image data captured without firing a strobe light and the second image data captured while firing a strobe light are compared with each other, to thus acquire the tendency of a color change in the subject stemming from firing of the strobe light. On the basis of the thus-acquired tendency of a color change, the environment light source is estimated.

On the basis of the values detected by an unillustrated AE sensor and a range sensor, an AE/AF/strobe control section 50 computes environment brightness and a distance to the subject, as well as computing the amount of exposure, the amount of actuation of the lens 14, the firing timing of a strobe light, the quantity of illumination, and the like. On the basis of the thus-acquired amount of exposure, or the like, the AE/AF/strobe control section 50 controls the timing of the TG 36. In accordance with the amount of actuation of the lens, the AE/AF/strobe control section 50 controls actuation of the lens 14. On the basis of the timing of firing of a strobe light and the quantity of light, the AE/AF/strobe control section 50 controls the strobe 46.

The WB gain acquisition section 51 computes a WB gain used for the WB gain process that has already been described. The WB gain acquisition section 51 is roughly divided into a block information acquisition section 52, an environment light source estimation section 54, and a gain-computing section 56. The block information acquisition section 52 divides the image obtained through photographing into a plurality of blocks (a block), and computes as block information typical values of the respective blocks and the type of light source of each of the blocks. The environment light source estimation section 54 estimates an environment light source on the basis of the acquired block information or the like. The gain-computing section 56 computes a WB gain on the basis of the estimated environment light source, the block information, and the like. The thus-computed WB gain is output to the WB processing section 28 that has already been described. In the case of settings of manual WB processing, where the user specifies the environment light source, block information is output directly to the gain computing section 56 without being output to the environment light source estimation section 54. In reality, the AE/AF/strobe control section 50 and the WB gain acquisition section 51 are embodied as some of the functions of the CPU 48. Although descriptions of the CPU 48 are omitted, the CPU 48 controls the entirety of the digital camera 10 based on the command from the user, including control of AE, AF, and strobe and computation of a WB gain, which have already been described. The command from user is input via operation section 58.

The flow of AWB processing performed by the digital camera 10 will now be described. First, the flow of conventional AWB processing will be briefly described. In conventional AWB processing, when a main image is photographed in accordance with a photographing command from the user, an environment light source is estimated on the basis of the acquired main image, and an AWB gain responsive to the estimated environment light source is computed. Here, estimation of the environment light source based on the main image is performed according to the following procedures. First, the main image stored in the image memory 24 is divided into a plurality of blocks (block). Subsequently, a typical color value of each of the blocks; specifically, a mean color value of a plurality of pixels constituting each block, is computed. When the typical values of each of the blocks have been successfully computed, the type of a light source of each block is determined on the basis of the typical values. Determining the type of a light source on a per-block basis is performed within a previously-specified white-colored article color range. The white-colored article color range shows the color range of a white-colored article acquired under various types of light sources. As is well known, the color actually emitted from a white-colored article changes according to the type of a light source. The color range of a white-colored article shows a color range of a white/colored article acquired according to the type of the light source.

Figure 2:
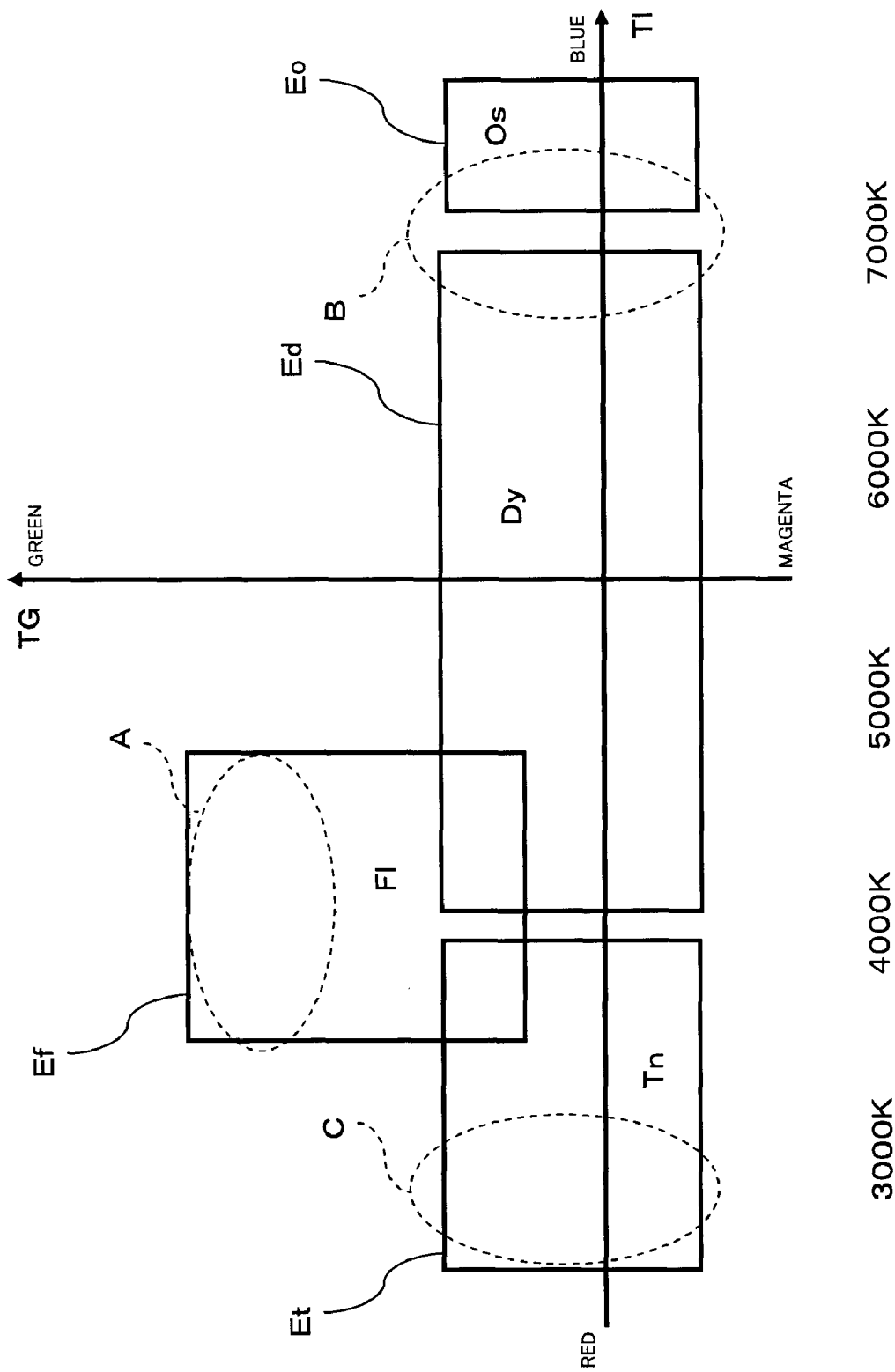
FIG. 2 is a view showing an example color range of a white article.

FIG. 2 is a view showing an example white-colored article color range. FIG. 2 shows that a color range of a white-colored article acquired under respective types of light sources is represented in a color space called a T space. The following equation is used for converting the color represented by an RGB value into coordinate values in the T space.

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix}$$

In this expression, Tl represents the brightness of a block; and Tg, Ti each represent a color difference of a block. T space represents a color while taking Tg as an x axis and Ti as a y axis. The matrix of linear conversion employed herein is a mere example, and another matrix may also be used.

A rectangular shape shown in FIG. 2 shows the color range of a white-colored article acquired under various types of light sources. A rectangle Ef shows the color range of a white-colored article acquired under fluorescent light; a rectangle Ed shows the color range of a white-colored article acquired under daylight; a rectangle Eo shows the color range of a white-colored article acquired under partial sunlight; and a rectangle Et shows the color range of a white-colored article acquired under tungsten light.

In conventional AWB processing, the color range of a white-colored article and typical values of each of the blocks of the main image are compared with each other, to thus determine the type of a light source of each of the blocks of the main image. Namely, the typical coordinate values of each of the blocks in the T space are determined, to thus determine which one of the color ranges for a white-colored article includes the coordinates of interest. For instance, when the typical coordinate values are situated within the rectangle Ef, the type of the light source of that block can be determined to be "fluorescent light." In the meantime, when the coordinate values are included in none of the white-colored article color ranges, the light source of that block is determined to be none. Upon completion of computing typical values and determining the type of the light source in connection with all the blocks constituting the main image, the number of blocks is counted according to the type of the light source. The type of the light source, which has the largest number of blocks as a count, is determined to be the light source of the entire main image; namely, the environment light source. When the environment light source of the entire main image has been successfully determined, the degree of contribution of the environment light source to the entire main image is determined, to thus compute the AWB gain responsive to the degree of contribution.

As above, in conventional AWB processing, the environment light source is estimated from the main image, and an AWB gain responsive to the environment light source is computed. Here, accurately estimating the environment light source is indispensable for computing an appropriate AWB gain. However, under the conventional method for estimating the environment light source on the basis of only a main image, difficulty is encountered in accurately estimating the environment light source. The reason for this is that the color of a colored article acquired under a certain light source is included in the white-colored article color range acquired under another light source. The color of a green article (e.g., leaves of a plant, or the like) acquired under daylight has hitherto been known to be analogous to the color of a white article acquired under fluorescent light. In addition, the color of an orange-colored article acquired under daylight is analogous to the color of a white article acquired under tungsten light. Moreover, the color of a light-blue-colored article acquired under fluorescent light is also known to be analogous to the color of a white article acquired under daylight. An oval indicated by a broken line shown in FIG. 2 shows the color range of a colored article included in the color range of a white article acquired under another light source. Specifically, an oval A designates the color range of a green-colored article acquired under daylight; an oval B designates the color range of a light-blue-colored article acquired under fluorescent light; and an oval C designates the color range of an orange-colored article acquired under daylight. When the typical values of the respective blocks fall within the color ranges A to C of these colored articles, there may be a risk of the light sources of the respective blocks being erroneously determined. More specifically, when the typical values fall within the oval A, the block can be determined to be either a white article under fluorescent light or a green-colored article under daylight. Consequently, there is a case where the type of the light source of each of the blocks is erroneously determined, and consequently the type of the light source for the entire image (i.e., the environment light source) is erroneously estimated.

In the present embodiment, in order to prevent occurrence of such erroneous estimation and to estimate an environment light source more accurately, first and second image data, which are preliminary images, are acquired prior to photographing of a main image, and an environment light source is estimated on the basis of the first and second image data. The first image data is captured without firing a preliminary strobe light, and the second image data is captured while firing a preliminary strobe light. The environment light source is estimated on the basis of the tendency of a color change between the first and second image data; in other words, the tendency of a color change achieved before and after firing of a preliminary strobe light. Flow of AWB processing utilizing the first and second image data will be described hereinbelow.

Figure 3:
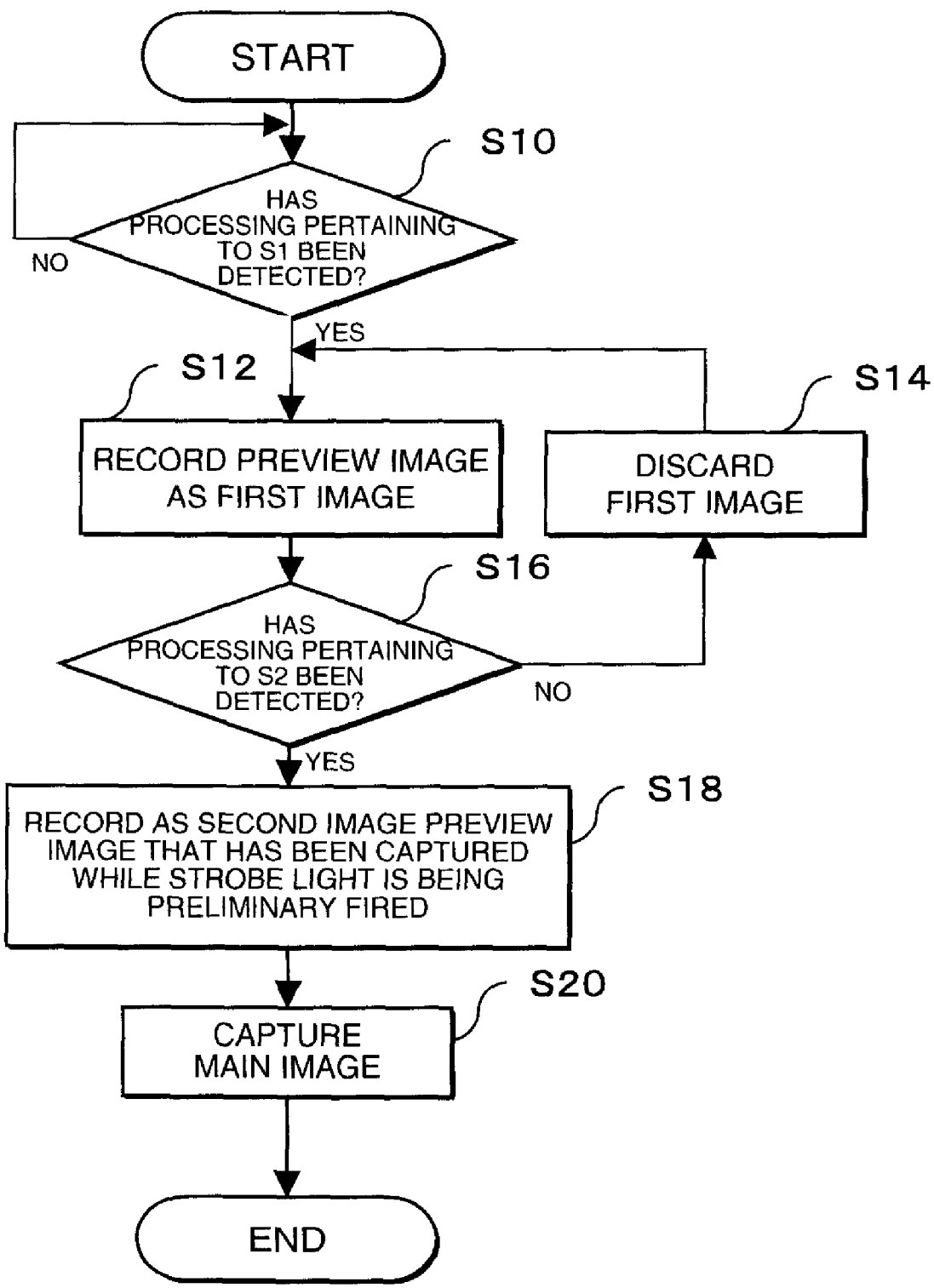
FIG. 3 is a flowchart showing the flow of photographing processing adopted at the time of setting of AWB.

FIG. 3 is a flowchart showing the flow of photographing operation performed with AWB processing being instructed as the WB setting. In the present embodiment, in contrast with ordinary photographing operation, preliminary images; namely, first and second image data, are also captured in addition to photographing of a main image intended by the user. As will be described in detail later, the first and second image data are utilized for estimating an environment light source. The flow of photographing processing of the present embodiment will be described hereinbelow.

As has already been described, the digital camera 10 acquires a preview image to be displayed on the LCD 34 at all times. After having been displayed on the LCD 34, the acquired preview image is discarded. In this state, upon detection of halfway pressing of a release switch, the CPU 48 of the digital camera 10 temporarily records the preview image as a first image data in image memory (S10, S14).

Unless full pressing of the release switch is detected before acquisition of the next preview image after acquisition of the first image data (S2), the first image data recorded in the image memory is discarded. A newly-acquired preview image is stored in place as a first image data in the image memory (S14, S12). These operations are iterated until a release switch S2 is detected.

When the release switch S2 has been detected before acquisition of the next preview image after acquisition of the first image data, the next preview image is taken as a second image data (S18). The second image data is acquired by means of performing photographing operation while firing a preliminary strobe light. Specifically, the AE/AF/strobe control section 50 commands the strobe 46 to fire a strobe light at a point in time when the release switch S2 has been detected. The preview image, which has been acquired by performing photographing operation while firing a preliminary strobe light, is stored as the second image data in the image memory.

When the second image data has been acquired, photographing a main image is successively performed (S20). The main image is stored in the image memory 24 as an image intended by the user. When the first image data, the second image data, and the main image have been acquired through the above-described flow of processing, photographing operation is completed.

The reason why the first image data is acquired before detection of the release switch S2 is to shorten a time which elapses from operation of the release switch S2 until photographing of a main image. In short, the release switch S2 corresponds to the image photographing command from the user. When the time that elapses from receipt of such an image photographing command until photographing of a main image is long, there may arise a case where an image intended by the user is not obtained. In the present embodiment, the first image data is acquired before operation of the release switch S2. As will be described in detail later, the subject of the first image data and the subject of the second image data are required to be essentially the same as the subject of an actual photographed image. Put another way, desirably, no significant time difference arises from capturing of the first image data until acquisition of the main image. In the present embodiment, as mentioned previously, acquisition and discarding of a first image data are repeated from detection of the release switch S1 to detection of the release switch S2, and the preview image acquired immediately before the release switch S2 is stored as a first image data.

In order to shorten the time that elapses from operation of the release switch S2 until photographing of a main image, capturing a second image data before operation of the release switch S2 is also desirable. However, the time that elapses from detection of the first release switch S1 until detection of the second release switch S2 is determined by the user and cannot be predicted by the camera. In the case of the first image data which does not involve firing of a preliminary strobe light, a preview image acquired immediately before operation of the release switch S2 can be acquired as a first image data by means of repeating acquisition and discarding of a preview image. In contrast, the second image data must be a preview image which involves firing of a preliminary strobe light. When acquisition and discarding of such a second image data has been repeated, preliminary illuminating is performed repeatedly. Repeated firing of preliminary flash is unpleasant for the user, and raises a problem of excessive consumption of a battery or the user erroneously believing that a failure has occurred. For these reasons, in the present embodiment, capturing of the second image data is performed only once, immediately after operation of the release switch S2.

Figure 4:
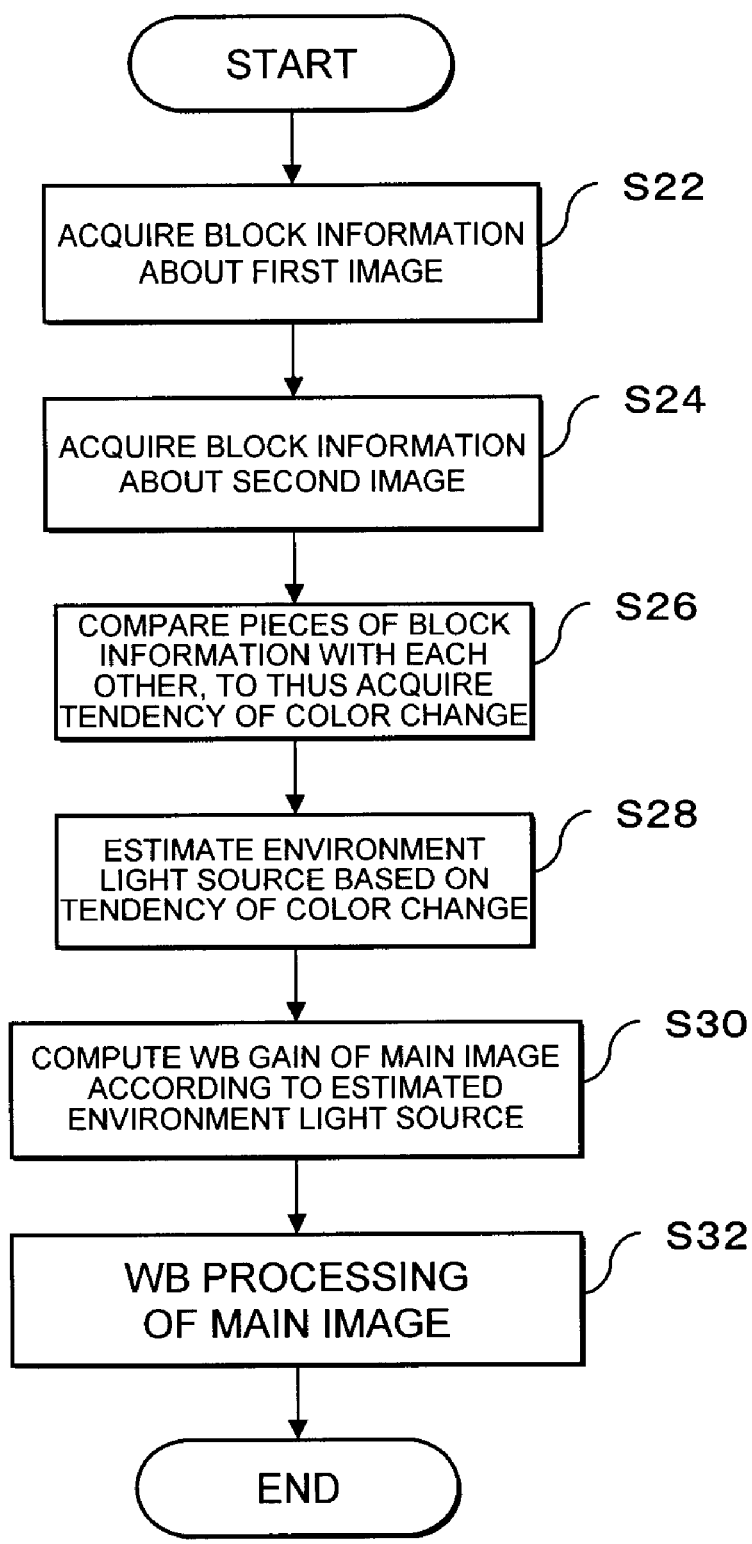
FIG. 4 is a flowchart showing the flow of AWB processing.

AWB processing utilizing the first and second image data, which have been captured as mentioned above, will now be described by reference to FIG. 4. FIG. 4 is a flowchart showing flow of AWB processing which is performed in conjunction with the image photographing processing shown in FIG. 3.

When AWB processing is performed, the first image data is first divided into a plurality of blocks, and block information about the first image data is acquired (S22). Here, the block information is information, such as a typical color value of each of the blocks, the type of the light source of each of the blocks, and the like. In the present embodiment, a mean value of the color values of the plurality of pixels constituting each of the blocks is handled as a typical value. An additional value of a pixel, or the like, is handled as a typical value, so long as the additional value is a parameter showing color information about each of the blocks. The type of the light source of each of the blocks is determined on the basis of the typical value of a block of interest and a predetermined white-colored article color range of the same. The white-colored article color range used herein is identical with a conventional white-colored article color range; namely, a white-colored article color range as illustrated in FIG. 2. The typical value of each of the blocks of the first image data is compared with the white-colored article color range, to thus determine the type of the light source of each block. The thus-acquired typical value of each of the blocks and the type of the light source are temporarily stored as block information about the first image data.

After the block information about the first image data has been acquired, there is acquired block information about the second image data that has been acquired by performing photographing operation while firing a preliminary strobe light (S24). Specifically, as in the case of the first image data, the second image data is divided into a plurality of blocks, and a typical value of each of the blocks is computed. The typical value of each of the blocks of the second image data is compared with the white-colored article color range, to thus determine the type of the light source of each of the blocks. The typical value of each of the blocks and the type of the light source, which have been thus acquired, are temporarily stored as block information about the second image data.

Figure 5:
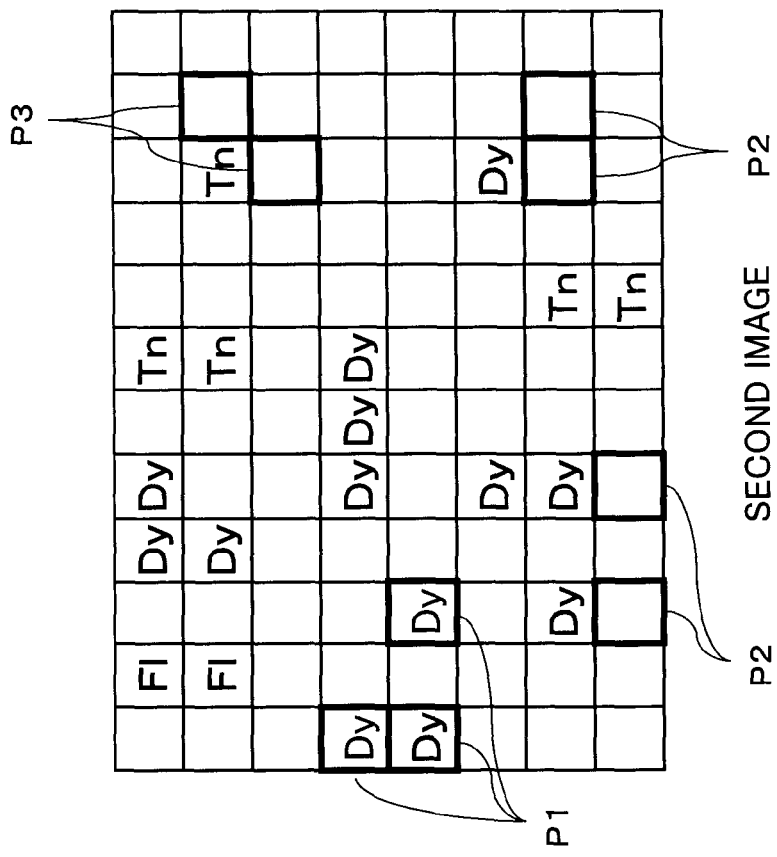
FIG. 5 is a view showing an example result of determination of a light source made on the basis of first and second image data.
Figure 5:
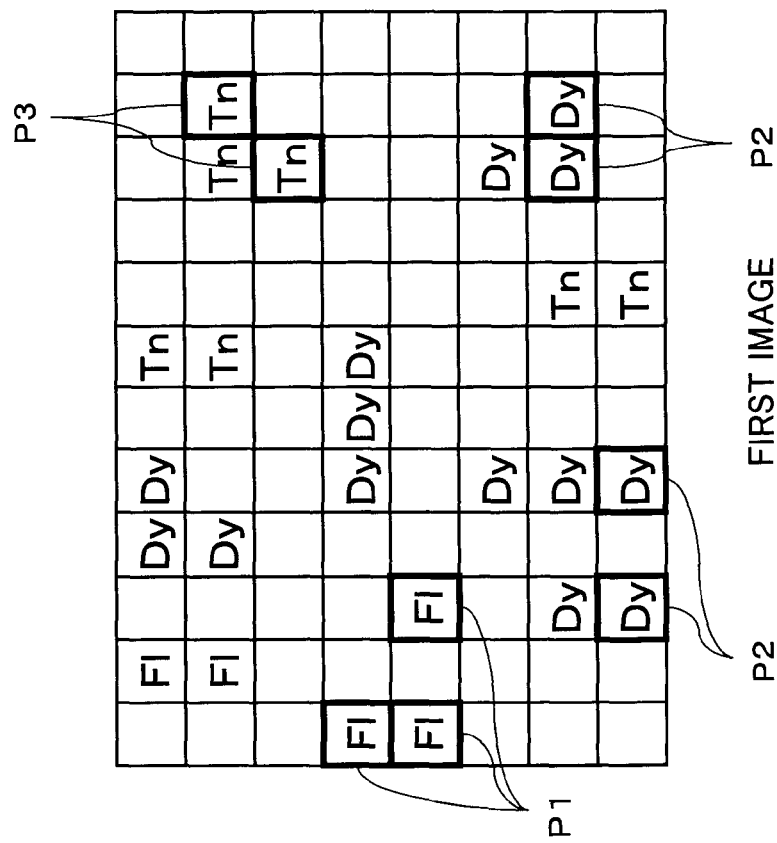

FIG. 5 is a view showing example results of determination of the light sources of respective blocks in the first and second image data. In FIG. 5, "Fl" designates a block for which the light source is determined to be fluorescent light; "Dy" designates a block for which the light source is determined to be "daylight"; and "Tn" designates a block for which the light source is determined to be tungsten light. A block given no symbol designates a block which is determined to have no light source.

Next, the block information about the first image data is compared with the block information about the second image data, to thus acquire the tendency of a color change before and after firing of a preliminary strobe light (S26). Various computing methods are conceivable for acquiring the tendency of a color change. In the present embodiment, proportions of number of blocks for which changes are detected in the types of the light source between the first image data and the second image data and the types of the light sources acquired before and after occurrence of a change are stored as the tendency of a color change.

For instance, in the case of the embodiment shown in FIG. 5, blocks P1, P2, and P3 enclosed by a thick line correspond to blocks for which the types changes are detected in the light sources between the first and second image data. In FIG. 5, three blocks P1 of five blocks in the first image data, which are designated by F1, are known to have changed to "Dy" in the second image data. Namely, the F1 blocks have changed to "Dy" blocks in a proportion of 3/5. Similarly, "Dy" blocks are known to have changed to blocks of no light sources (outside the white-colored article color range) in a proportion of 4/14. "Tn" blocks are known to have changed to blocks of no light sources (outside the white-colored article color range) in a proportion of 2/4. In the present embodiment, the proportions of changed blocks for respective types of the light sources and the types of the light sources achieved after changes are computed as the tendency of a color change.

Figure 6:
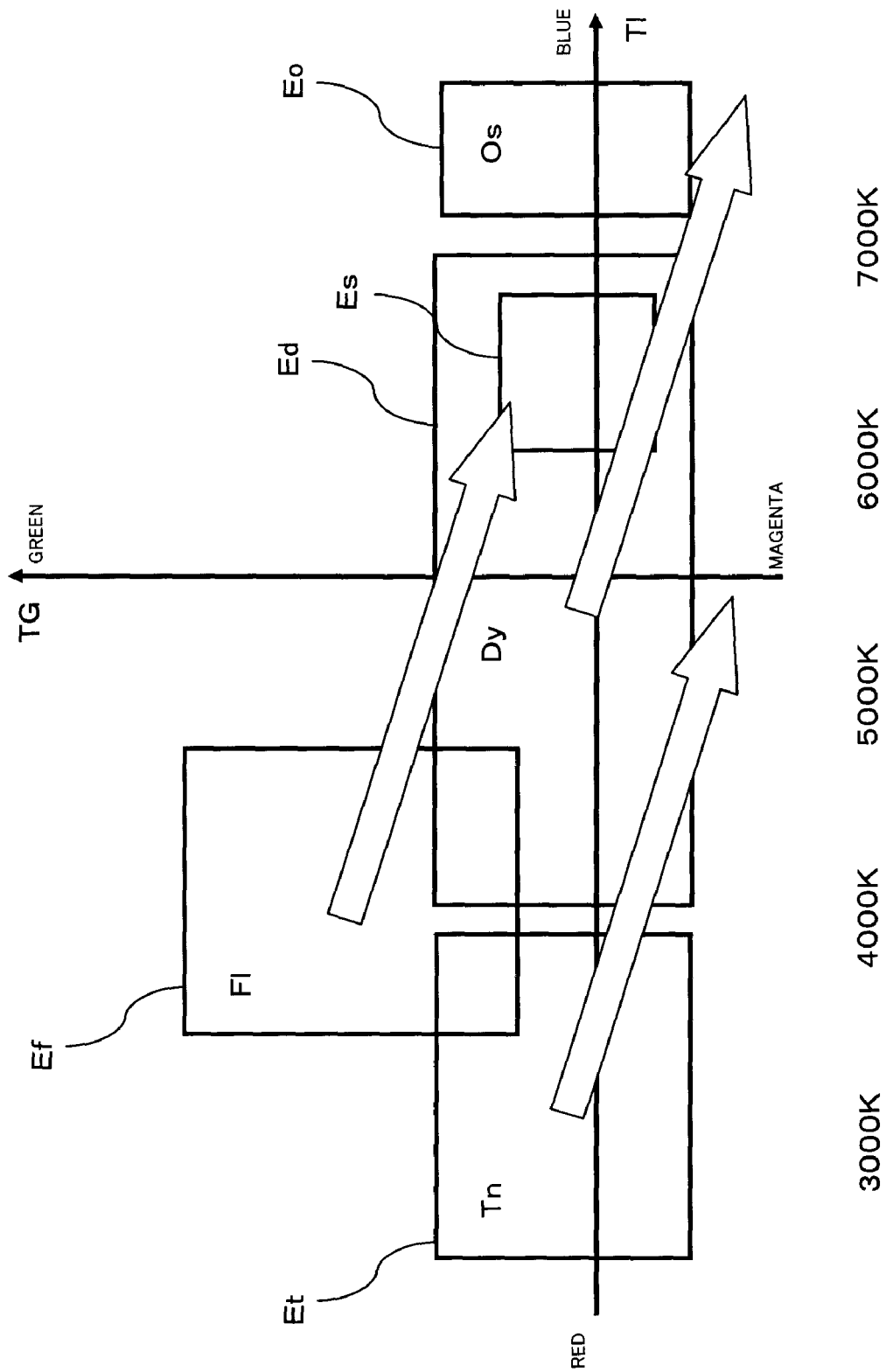
FIG. 6 is a view showing the tendency of a color change acquired when a strobe light is fired under fluorescent light.
Figure 7:
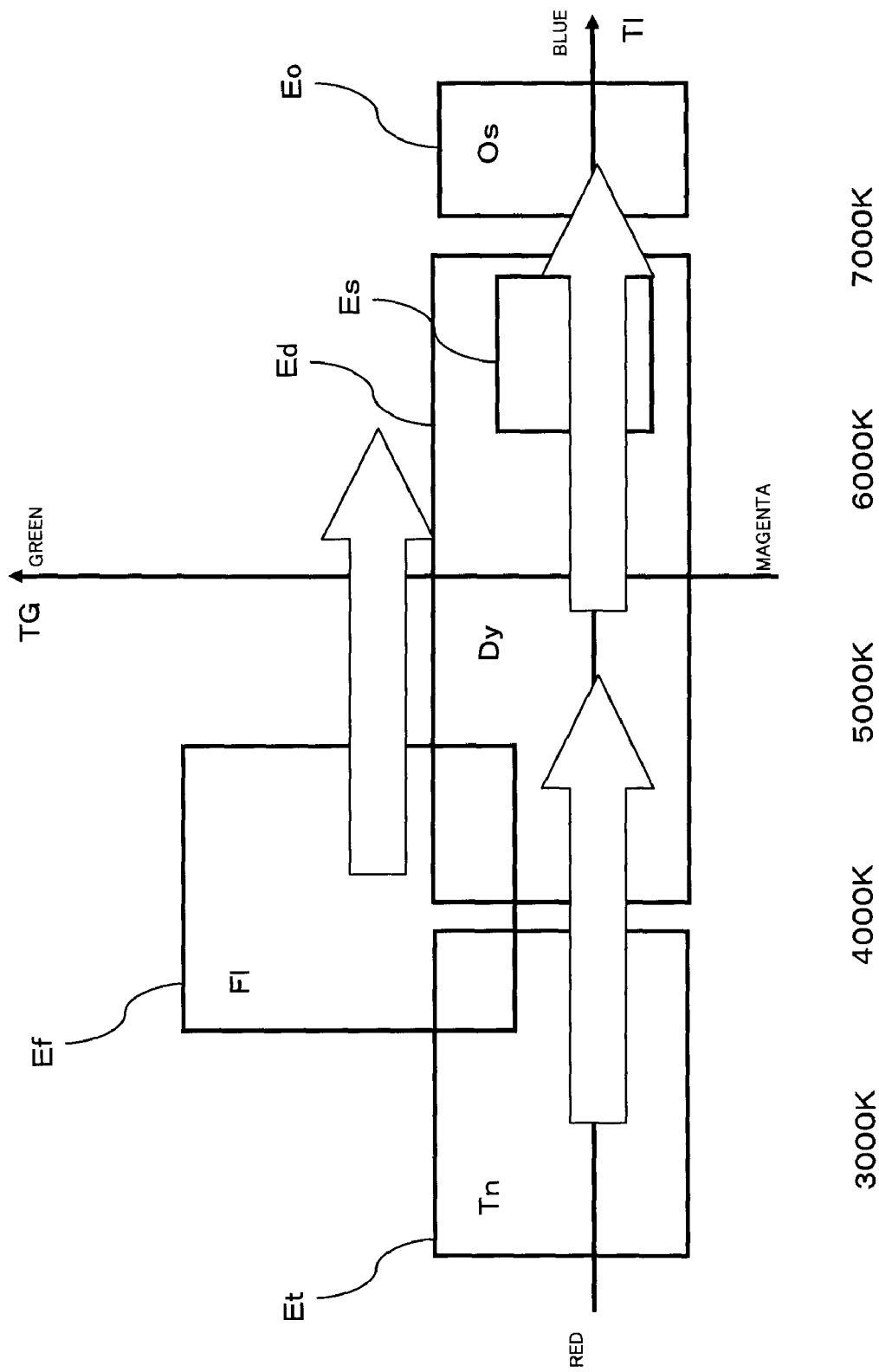
FIG. 7 is a view showing the tendency of a color change acquired when the strobe light is fired under tungsten light.
Figure 8:
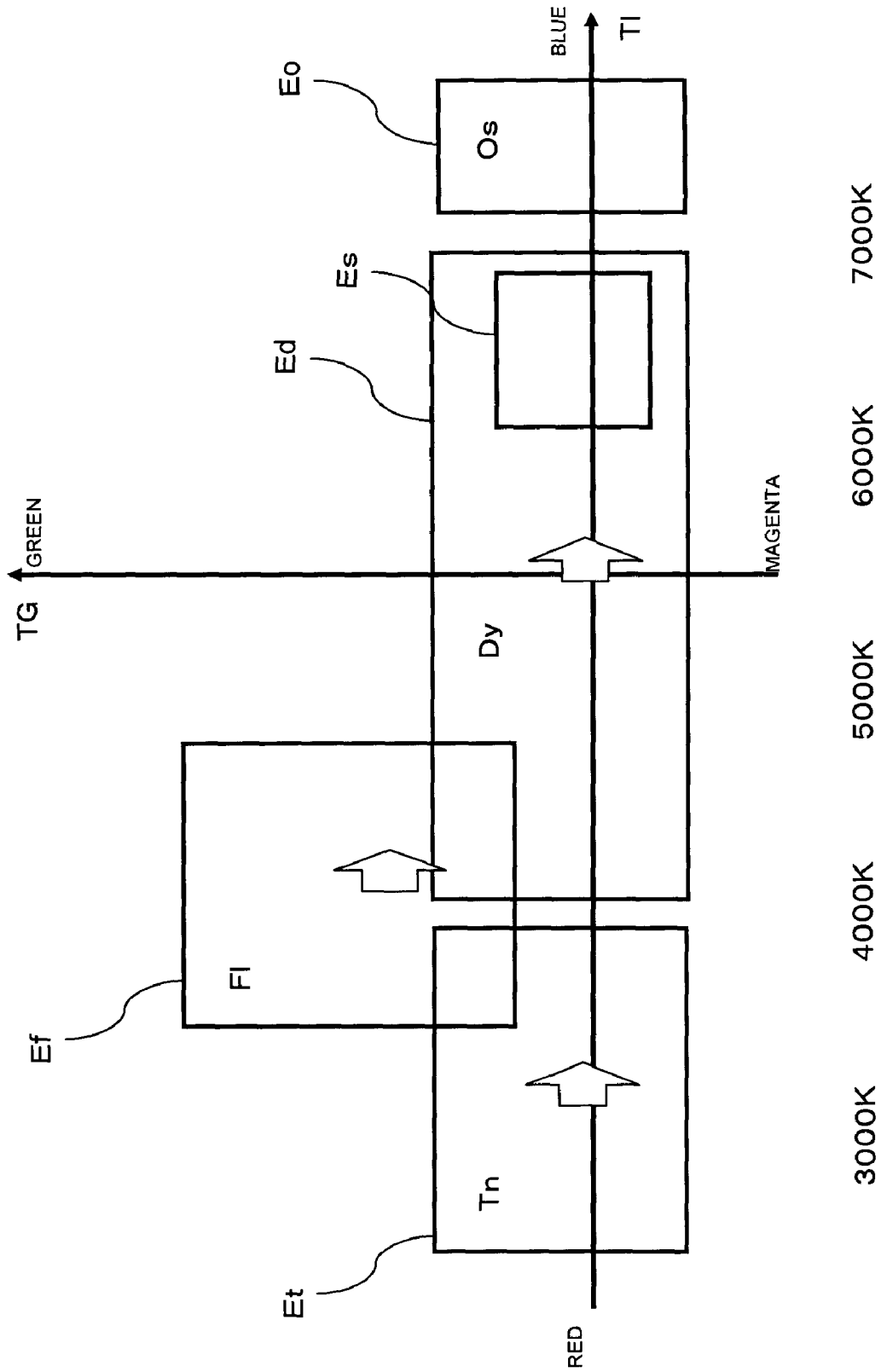
FIG. 8 is a view showing the tendency of a color change acquired when a strobe light is fired under daylight.

After the tendency of a color change has been computed, an environment light source is successively estimated on the basis of the tendency of a color change (S28). The principle that an environment light source can be estimated on the basis of the tendency of a color change acquired before and after firing of preliminary light will now be described. As a matter of course, when a preliminary strobe light has been fired, the color of the subject changes under the influence of the preliminary light. The tendency of this color change (acquired during nonfiring of a strobe light) is known to vary according to the type of an environment light source. FIGS. 6 to 8 are views showing directions in which the color changes acquired when a strobe light is fired under environment light sources of "fluorescent light," "tungsten light," and "daylight." For reference, FIGS. 6 to 8 also illustrate a white-colored article color range Es acquired under a strobe light.

As shown in FIG. 6, when a strobe light is fired under fluorescent light, the color of the subject greatly shifts toward a blue color as well as toward a magenta color. Accordingly, the color—falling within a white-colored article color range Ef of "Fluorescent light (Fl)" before firing of preliminary light—has shifted toward a white-colored article color range Ed of "Daylight (Dy)" because of preliminary illumination. The color which falls within a white-colored article color range Et of "Tungsten light (Tn)" before firing of preliminary light has shifted outside of the white-colored article color range. The color which falls within a white-colored article color range Ed of "Daylight (Dy)" before firing of preliminary light has shifted outside of the white-colored article color range.

As shown in FIG. 7, when a strobe light is fired with the environment light source being in the state of "Tungsten light," the color of the subject greatly shifts solely toward a blue color. Consequently, the color—falling within a white-colored article color range Ef of "Fluorescent light (Fl)" before firing of preliminary light—shifts outside of the white-colored article color range because of preliminary illumination. The color which falls within a white-colored article color range Et of "Tungsten light (Tn)" before firing of preliminary light shifts toward the white-colored article color range Ed of "Daylight (Dy)." The color which falls within a white-colored article color range Ed of "Daylight (Dy)" before firing of preliminary light shifts toward a white-colored article color range Eo of "Light in a sunny location and shade (Os)."

As shown in FIG. 8, when a strobe light is fired with the environment light source being in the state of daylight, the color of the subject slightly shifts only toward the blue color. Consequently, even when preliminary light has been fired, no substantial changes arise in color.

In the present embodiment, the type of the environment light source of the main image is estimated on the basis of a difference in the tendencies of a color change derived from firing of a strobe light according to the type of an environment light source performed during nonfiring of a strobe light. The first image data captured without firing of a strobe light and the second image data captured while firing a strobe light are compared with each other. Consequently, when some of the "Fl" blocks have changed to the "Dy" blocks; some of the "Tn" blocks have changed to "No light source" blocks; and some of the "Dy" blocks have changed to "No light source" blocks, the environment light source acquired during nonfiring of a strobe light is determined to be "Fluorescent light (Fl)." When some of the "Fl" blocks have changed to the "No light source" blocks; some of the "Tn" blocks have changed to "Dy" blocks; and some of the "Dy" blocks have changed to "No light source" blocks, the environment light source acquired during nonfiring of a strobe light is determined to be "Tungsten light (Tn)." Moreover, when no substantial color change has arisen between the first and second image data, the environment light source acquired during nonfiring of a strobe light is determined to be "Daylight (Dy)."

Figure 9:
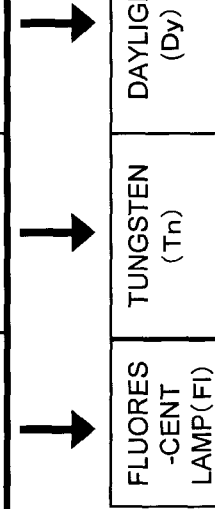
FIG. 9 is a view showing a relationship between the tendency of a color change and an estimated environment light source.

FIG. 9 is a table showing a relationship between the tendency of a color change between the first and second image data and the type of an environment light source estimated on the basis of the tendency of the color change. In the present embodiment, the tendency of a color change acquired in step S26 is applied to the table illustrated in FIG. 9, to thus estimate the type of the environment light source. For instance, in a case illustrated in FIG. 5, three-fifths of "Fl" blocks have changed to "Dy" blocks from the first image data to the second image data; four-fourteenths of "Dy" blocks have changed to "No light source (outside of a white substance color range)" from the first image data to the second image data; and two-fourths of "Tn" blocks have changed to "No light source (outside of a white substance color range)" from the first image data to the second image data. Consequently, when the first and second image data shown in FIG. 5 are captured, the environment light source acquired during non-firing of a strobe light can be estimated to be "Fluorescent light (Fl)."

So long as the environment light source can be estimated on the basis of the tendency of a color change, a subsequent processing flow is analogous to a processing flow subsequent to estimation of an environment light source which is performed by means of computing a conventional AWB gain. Specifically, a typical value and the type of a light source for each of the blocks are determined by dividing a main image into a plurality of blocks. On the basis of the number of blocks whose light source is determined to be identical in type with the estimated environment light source, the degree of contribution of the environment light source to the entire image is determined. On the basis of the type of an environment light source, the degree of contribution, or the like, an AWB gain is computed. So long as the AWB gain has been successfully computed, the data pertaining to the main image are multiplied by the AWB gain, and AWB processing is completed.

As is evident from the above description, in the present embodiment, the environment light source is estimated on the basis of the color change in the focused subject space acquired before and after firing of a strobe light. Therefore, even when a main image includes large amounts of color portions where the light source is likely to be erroneously determined (the ovals A to C shown in FIG. 2), an environment light source can be accurately estimated. Consequently, an appropriate AWB gain can be obtained at all times regardless of the color of the subject.

Figure 10:
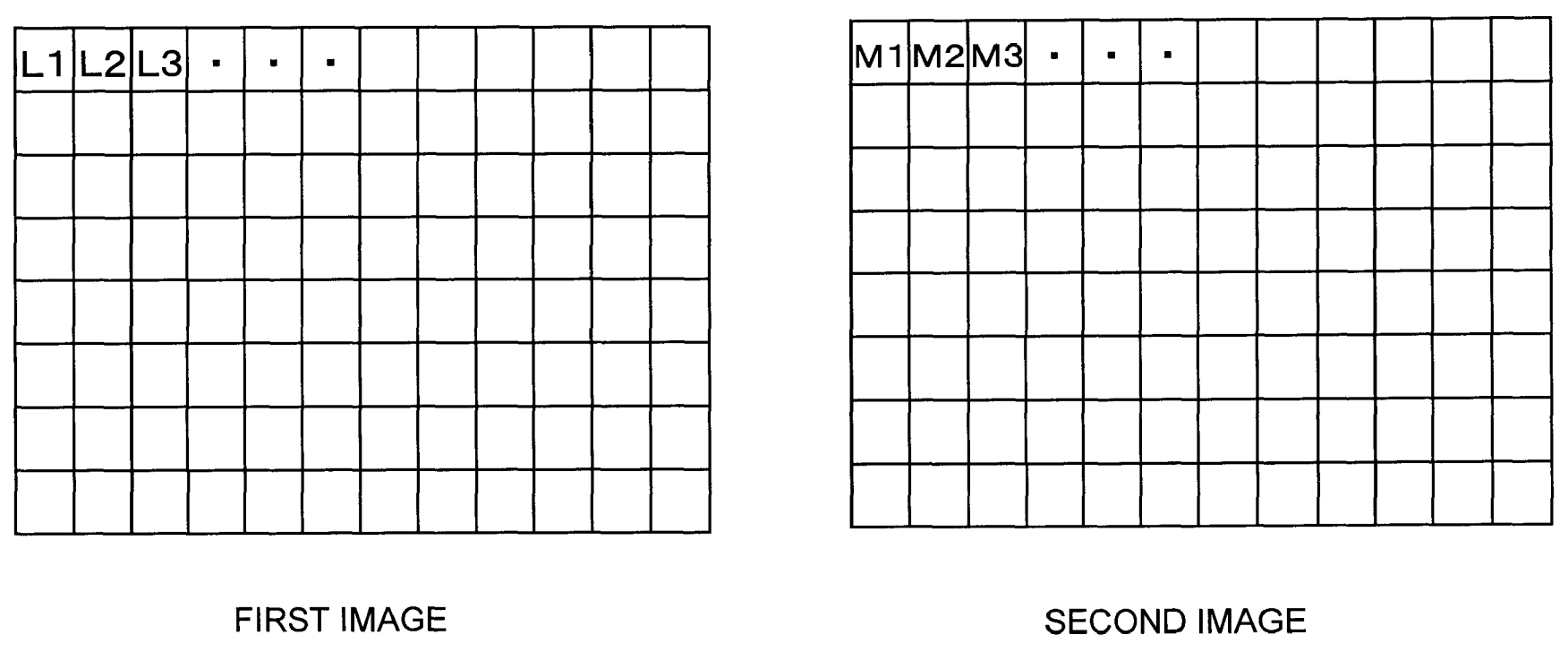

In the present embodiment, the proportions of changes of the blocks in connection with the type of the light source and the types of the light sources acquired after changes have arisen in the type of the light source from the first image data to the second image data are acquired as the tendency of a color change. However, as a matter of course, another parameter may be acquired as the tendency of a color change, so long as the parameter shows the tendency of a change in the color of a subject before and after firing of a strobe light. For instance, an acquired tendency of a color change may be a mean value of amounts of changes having arisen between the first and second image data with regard to the typical value of a single coordinate block. As shown in FIG. 10, a typical value of each of the blocks of a first image data is assumed to be $Li=(L_{TT}i, L_{TG}i)$, and a typical value of each of the blocks of a second image data is assumed to be $Mi=(M_{TT}i, M_{TG}i)$, where "i" (i=1, 2, . . . n) designates a coordinate value of the block; $M_{TT}$ designates a coordinate value along the horizontal axis in the T space; and $M_{TG}$ designates a coordinate value along the vertical axis of the T space. In this case, the tendency of a color change Av may be acquired as $AV=(Av_{TT}, AV_{TG})=\{(\Sigma|Li-Mi|)/n\}$. Consequently, when both $V_{TT}$ and $V_{TG}$ assume small values, the environment light source acquired during non-firing of illumination can be determined to be "daylight." Further, when both $V_{TT}$ and $V_{TG}$ assume large values, the environment light source can be determined to be "fluorescent light." Further, when only $V_{TT}$ assumes a large value, the environment light source can be determined to be "Tungsten light."

Figure 11:
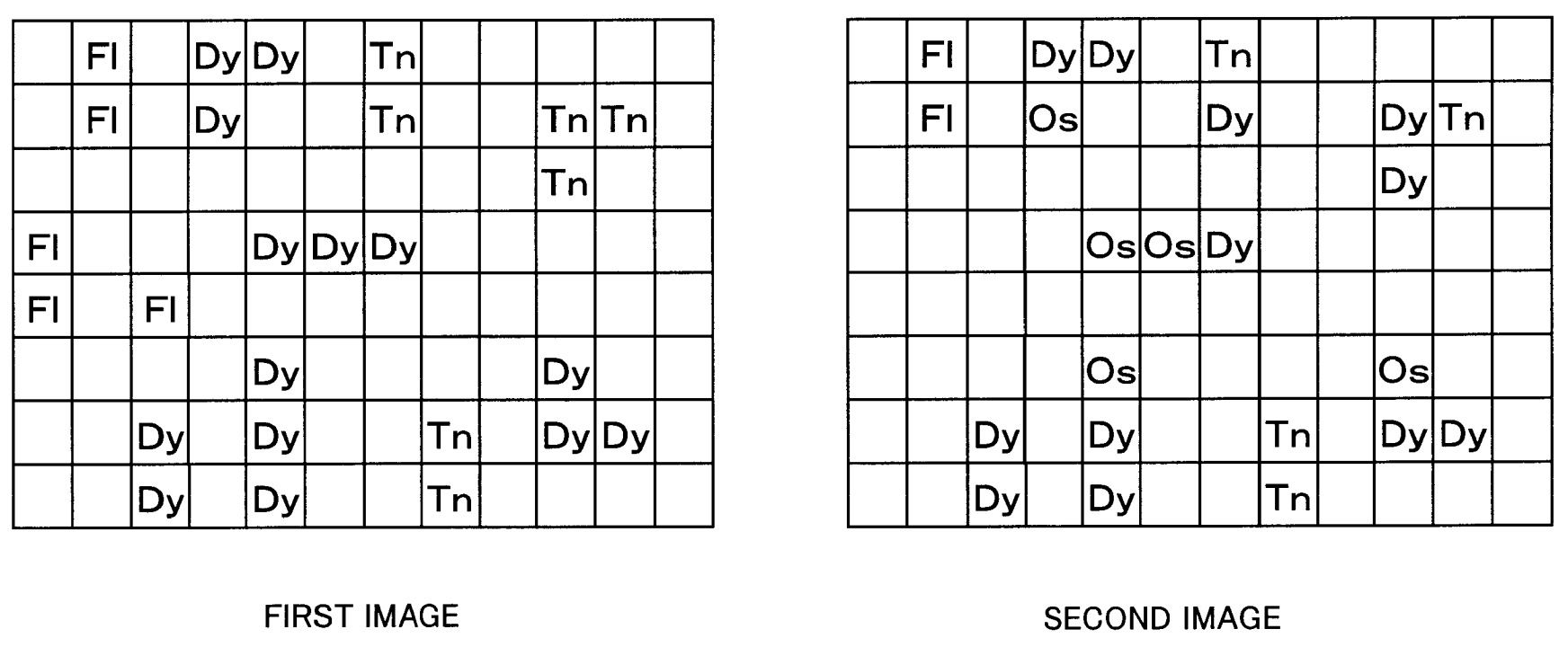

Only the number of changes in the types of the light sources of the blocks may be used as the tendency of a color change. For instance, results of determination of the light sources of the first and second image data, such as those shown in FIG. 11, are assumed to be obtained. The changes in number of blocks having certain light sources are ascertained to be −3 in the "Fl" blocks; −3 in the "Tn" blocks; −2 in the "Dy" blocks; and +5 in "Os" blocks. The "Fl" blocks and the "Tn" blocks are understood to exhibit a decreasing tendency, and the "Os" blocks are understood to exhibit an increasing tendency. The type of the environment light source, which exhibits a changing tendency as a result of firing of a strobe light, is only the "Tungsten light (FIG. 7)." Consequently, the type of the environment light source in the embodiment shown in FIG. 11 is understood to be "tungsten light."

Moreover, the tendency of a color change may be acquired without dividing the first and second image data into blocks. More specifically, a mean color value of the entire first image data and a mean color value of the entire second image data may be acquired, and a difference between the mean values may be acquired as the tendency of a color difference. In any event, any parameter can be adopted, so long as the parameter can be used for predicting the tendency of a color change between the first and second image data; i.e., the tendency of a color change in the subject acquired before and after firing of a strobe light.

Figure 12:
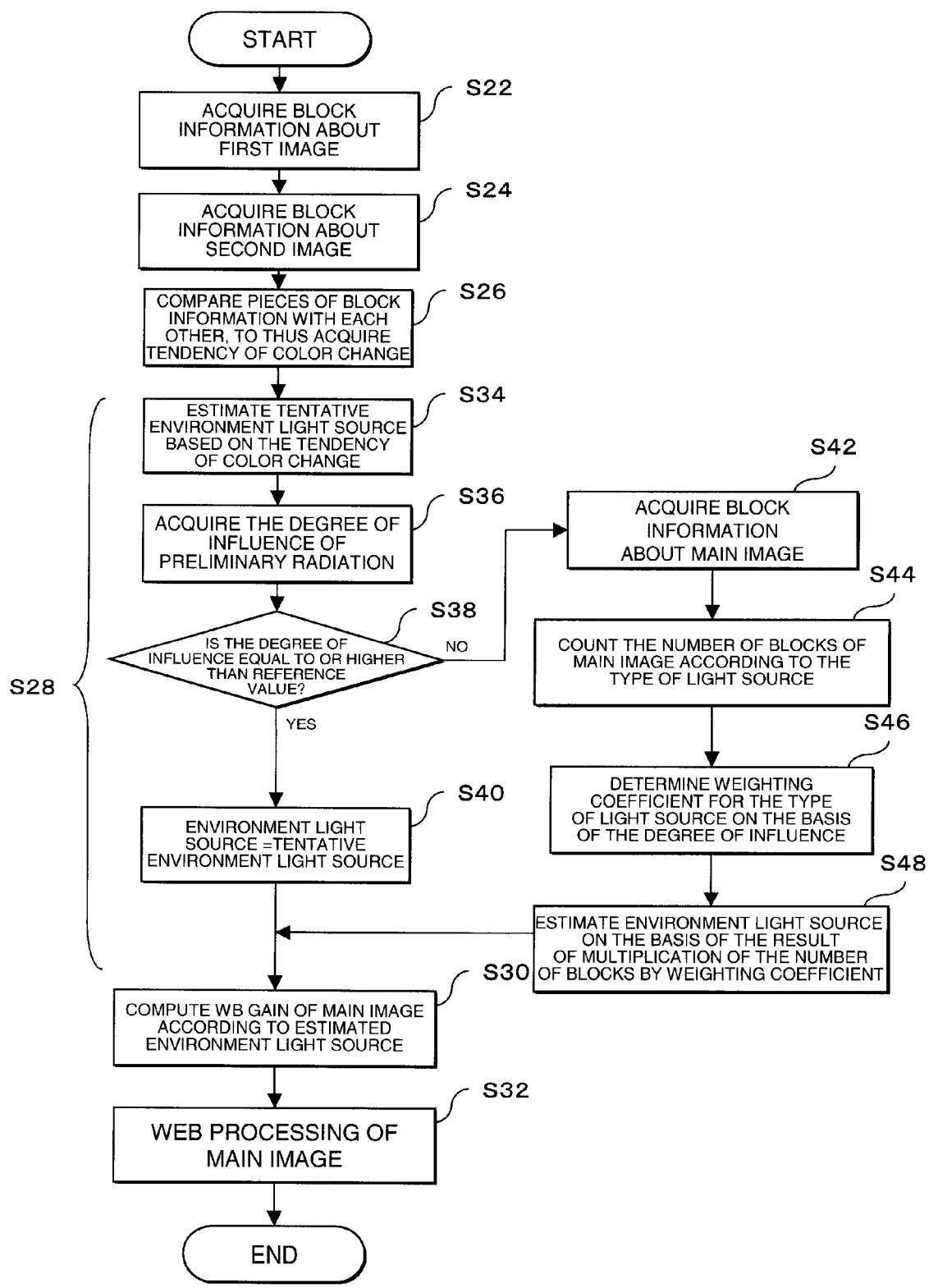
FIG. 12 is a flowchart showing the flow of AWB processing according to a second embodiment.

Next, a second embodiment will be described by reference to FIG. 12. FIG. 12 is a view showing the flow of AWB processing of the second embodiment. The flow of photographing processing employed in the second embodiment is identical with that of the first embodiment. Namely, photographing is performed by detection of the release switch S1 without firing a preliminary strobe light, to thus capture a first image data. Photographing is performed by detection of the release switch S2 while firing a preliminary strobe light, to thus capture a second image data. Subsequently, a main image is captured.

In relation to the flow of processing until acquisition of the tendency of a color change between first and second image data (S22 to S26), AWB processing of the second embodiment is identical with that of the first embodiment. The present embodiment differs from the first embodiment in terms of processing for estimating an environment light source (S28) performed after acquisition of the tendency of a color change. Specifically, in the present embodiment, an environment light source is estimated in consideration of the degree of influence imposed on the subject by preliminary radiation as well as the tendency of a color change between the first and second image data. The flow of AWB processing of the present embodiment will be described with attention being paid to processing for estimating an environment light source.

First, block information about a first image data and block information about a second image data are acquired (S22, S24). The tendency of a color change is acquired on the basis of the thus-acquired pieces of block information (S26). Subsequently, a tentative environment light source is estimated on the basis of the thus-obtained tendency of a color change (S34). A method for estimating a tentative environment light source is identical with a method for estimating an environment light source of the first embodiment. Specifically, when no substantial color change has arisen between the first and second image data, the environment light source is determined to be "daylight." When a great change toward the blue color has arisen between the first and second image data, the environment light source is determined to be "tungsten light." When a great change toward both a blue color and a magenta color has arisen between the first and second image data, the environment light source is determined to be "fluorescent light." The result of estimation of the environment light source based on this tendency of a color change is temporarily stored as a "tentative environment light source."

Subsequently, there is determined the degree of influence of preliminary illumination, being fired during photographing of a second image data, on a subject (S36). The degree of influence of preliminary illumination is assumed to be a proportion (Pev/Eev×100%) between brightness Pev and environment brightness Eev of preliminary illumination acquired in the subject. As the degree of influence on preliminary illumination becomes higher, a color change stemming from preliminary illumination can be said to be greater. Conversely, when the degree of influence on preliminary illumination is small, the color of the subject remains essentially unchanged before and after firing of preliminary illumination. Therefore, estimating the environment light source from the above-described tendency of a color change becomes difficult. Put another way, the degree of influence on preliminary illumination can be said to be a parameter which shows the reliability of a result of estimation of an environment light source made on the tendency of a color change.

Figure 13:
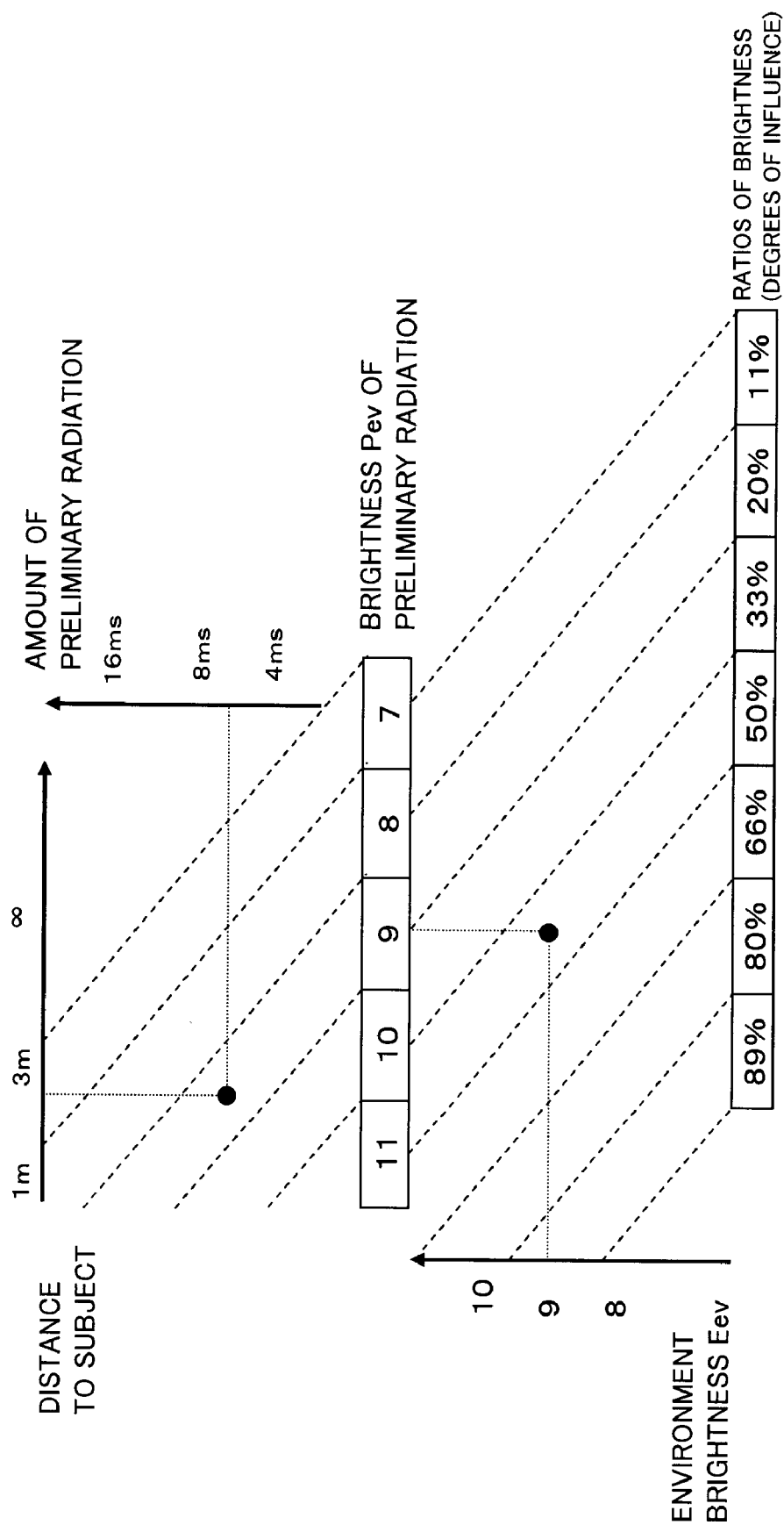
FIG. 13 is a view for describing an example mode for acquiring the degree of influence of preliminary illumination.

The environment brightness Eev is detected by means of a range sensor, or the like, provided in the digital camera. In the meantime, difficult is encountered in detecting the brightness Pev of preliminary flash in the subject by means of a sensor or the like. Hence, in the present embodiment, preliminary illumination brightness Pev is determined from a distance to the subject and the quantity of preliminary illumination. Specifically, the greater a distance to the subject and the smaller the quantity of preliminary illumination, the lower the probability of a strobe light for preliminary illumination reaching the subject. Therefore, preliminary illumination brightness Pev is assumed to become smaller. FIG. 13 is an illustration showing an example method for computing the degree of influence on preliminary illumination. In FIG. 13, the preliminary illumination brightness Pev is determined from the position of a point of intersection C1 between the distance to the subject and the quantity of preliminary illumination. Subsequently, a proportion between brightness Pev and environment brightness Eev of preliminary illumination, which correspond to the degree of influence on preliminary illumination, is determined from the position of a point of intersection C2 between the thus-determined preliminary illumination brightens Pev and the environment brightness Eev.

When the degree of influence on preliminary illumination has been successfully acquired, a determination is subsequently made as to whether or not the degree of influence is equal to or higher than a predetermined reference value (S38). A value, which is equal to or higher than the degree of influence at which the color of the subject changes its color before and after firing of preliminary illumination, is set as the reference value. When the degree of influence is equal to or higher than a predetermined reference value, the previously-described tentative environment light source is determined as an environment light source used for computing an AWB gain (S40). Subsequent processing is identical with that of the first embodiment.

In the meantime, when the degree of influence on preliminary illumination is less than the predetermined reference value, the possibility of a color change arising in the subject as a result of preliminary illumination being fired can be said to be low. Namely, when the degree of influence on preliminary illumination falls below the predetermined reference value, difficulty is encountered in accurately estimating an environment light source from only the tendency of a color change. Accordingly, in this case, the environment light source is estimated in consideration of color information about a main image.

Specifically, block information about a main image is first acquired (S42). Specifically, a main image is divided into a plurality of blocks, and a typical value of each of the blocks is determined. The type of the light source for each of the block is determined on the basis of the typical value.

Figure 14:
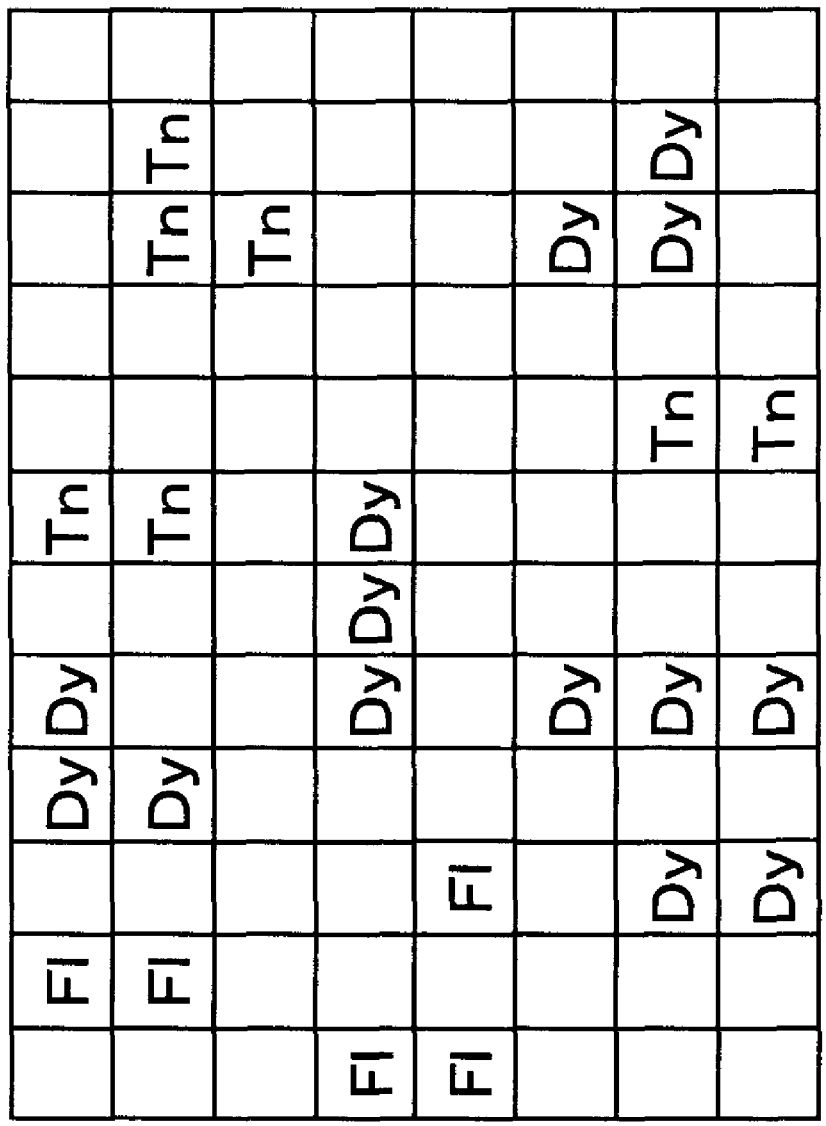
FIG. 14 is a view showing an example consequence obtained by determining the type of a light source in relation to blocks of a main image.

Next, there are computed the number of blocks for respective types of the light sources; namely, the number of blocks for which the light source is determined to be "fluorescent light," the number of blocks for which the light source is determined to be "tungsten light," the number of blocks for which the light source is determined to be "daylight," and the number of blocks for which the light source is determined to be "light in a sunny location and the shade" (S44). For instance, a result of determination of a block light source, such as that shown in FIG. 14, is assumed to be acquired. In this case, the number of fluorescent blocks is counted as five; the number of daylight blocks is counted as fourteen; and the number of tungsten light blocks is counted as seven.

Subsequently, weighting coefficients of the respective types of light sources are determined on the basis of a tentative environment light source (S46). A weighting coefficient of a light source, which is of the same type as that of the tentative environment light source, becomes largest. For instance, when the tentative environment light source is "fluorescent light," the weighting coefficient of "fluorescent light" is set to one; a weighting coefficient of "daylight" is set to 0.3; a weighting coefficient of "tungsten light" is set to 0.3; and a weighting coefficient of "light in a sunny location and the shade" is set to 0.3.

The numbers of blocks obtained for each of the types of the light sources is multiplied by the corresponding weighting coefficient. The type of the light source yielding the greatest product is determined to be an environment light source (S48). For instance, in the embodiment shown in FIG. 14, "fluorescent light" yields a product of 5×1=5; "daylight" yields a product of 14×0.3=4.2; "tungsten light" yields a product of 7×0.3=2.1; and "light in a sunny location and shade" yields a product of 0×0.3=0. In this case, the largest product belongs to "fluorescent light," and hence the environment light source can be estimated as "fluorescent light."

When the environment light source has been estimated, the degree of contribution of the environment light source to the entire image is determined, as in the case of conventional AWB processing, and an AWB gain responsive to the degree of contribution is determined (S30). The data pertaining to the main image are multiplied by the thus-obtained AWB gain, whereupon AWB processing is completed (S32).

As described above, in the present embodiment, the method for estimating an environment light source is changed as appropriate according to the degree of influence of preliminary illumination on the subject. Therefore, even when the quantity of preliminary illumination is small or when the subject is distant, an environment light source can be estimated with high reliability. Consequently, a more appropriate AWB gain can be obtained.

In the present embodiment, a proportion between environment brightness and preliminary illumination brightness is used as the degree of influence of preliminary illumination. As a matter of course, another parameter may be used as the degree of influence of preliminary illumination. For instance, the amounts of changes in brightness between the fist and second image datas may be employed as the degree of influence of preliminary illumination. When the amount of change in brightness is small, the strobe light for preliminary illumination has not reached the subject, and the degree of influence of preliminary illumination can be determined to be small. Alternatively, the degree of influence of preliminary illumination may also be determined from a proportion between environment brightness and the brightness of preliminary illumination and the amount of change in brightness. Specifically, the amount of change in brightness may be predicted from the proportion between environment brightness and the brightness of preliminary illumination. When the actual amount of brightness change in the first image data and the actual amount of brightness change in the second image data are smaller than predicted values, the strobe light for preliminary illumination has not reached the subject, and the degree of influence of preliminary illumination may be determined to be low. For instance, when the preliminary illumination brightness Pev is 50% of the environment brightness Eev, the brightness value of the second image data is expected to be 1.5 times as large as the brightness value of the first image data. In this case, when the actually-obtained brightness value of the second image data is less than 1.5 times as large as the brightness value of the first image data, the strobe light for preliminary illumination can be determined to have failed to sufficiently reach the subject. In this case, as in the case of steps S42 to S48, the environment light source is estimated by utilization of block information about the main image, as well.

Figure 15:
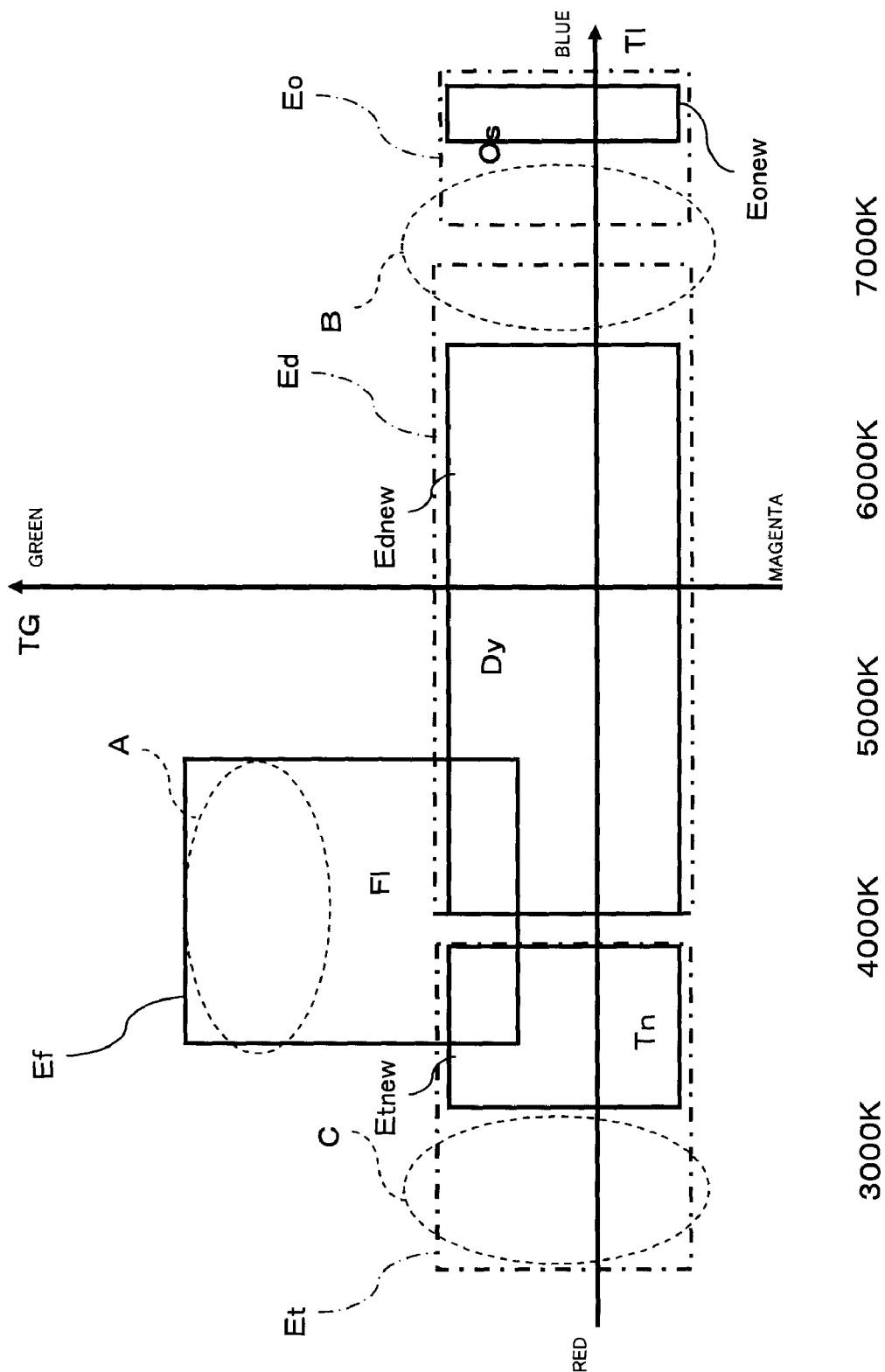
FIG. 15 is a view showing an example mode for correcting the color range of a white article.

The method for estimating an environment light source for the case—where the degree of influence of preliminary illumination is low—may also be changed as appropriate. For instance, when the degree of influence of preliminary illumination is low, the environment light source may be estimated by the same technique as that used for conventional AWB processing. Specifically, the environment light source may also be estimated from only the main image without taking into consideration the tendency of a color change. Further, the white-colored article color range may be corrected according to a tentative environment light source, and the environment light source may be estimated on the basis of the corrected white-colored article color range and block information about the main image. A conceivable corrected mode of the white-colored article color range is to remove an area, where the light source is likely to be erroneously determined, from the white-colored article color range for the type of the light source that differs in type from the tentative environment light source. FIG. 15 is a view showing a result of correction acquired when the tentative environment light source is "fluorescent light." In FIG. 15, each of rectangles Ed, Et, and Eo indicated by dashed lines designates an uncorrected white-colored article color range; ovals A to C indicated by broken lines designate areas where the light source is likely to be erroneously determined; and rectangles Ednew, Etnew, and Eonew indicated by solid lines designate corrected white-colored article color ranges. As is evident from FIG. 15, when the tentative environment light source is "fluorescent light," a white-colored article color range Ef for "fluorescent light" is not changed. In contrast, the white-colored article color range Et for "tungsten light," the white-colored article color range Ed for "daylight," and the white-colored article color range Eo for "light at a sunny plate and the shade," which are different from the tentative environment light source, are corrected such that the color ranges B, C, where an erroneous determination is likely to be made, are avoided, to thus compute new white-colored article color ranges Etnew, Ednew, and Eonew. When the environment light source is estimated, the types of the light sources of the respective blocks constituting the main image are determined on the basis of the corrected white-colored article color range, and the environment light source is estimated on the basis of the thus-obtained result of determination of a block light source.

Figure 16:
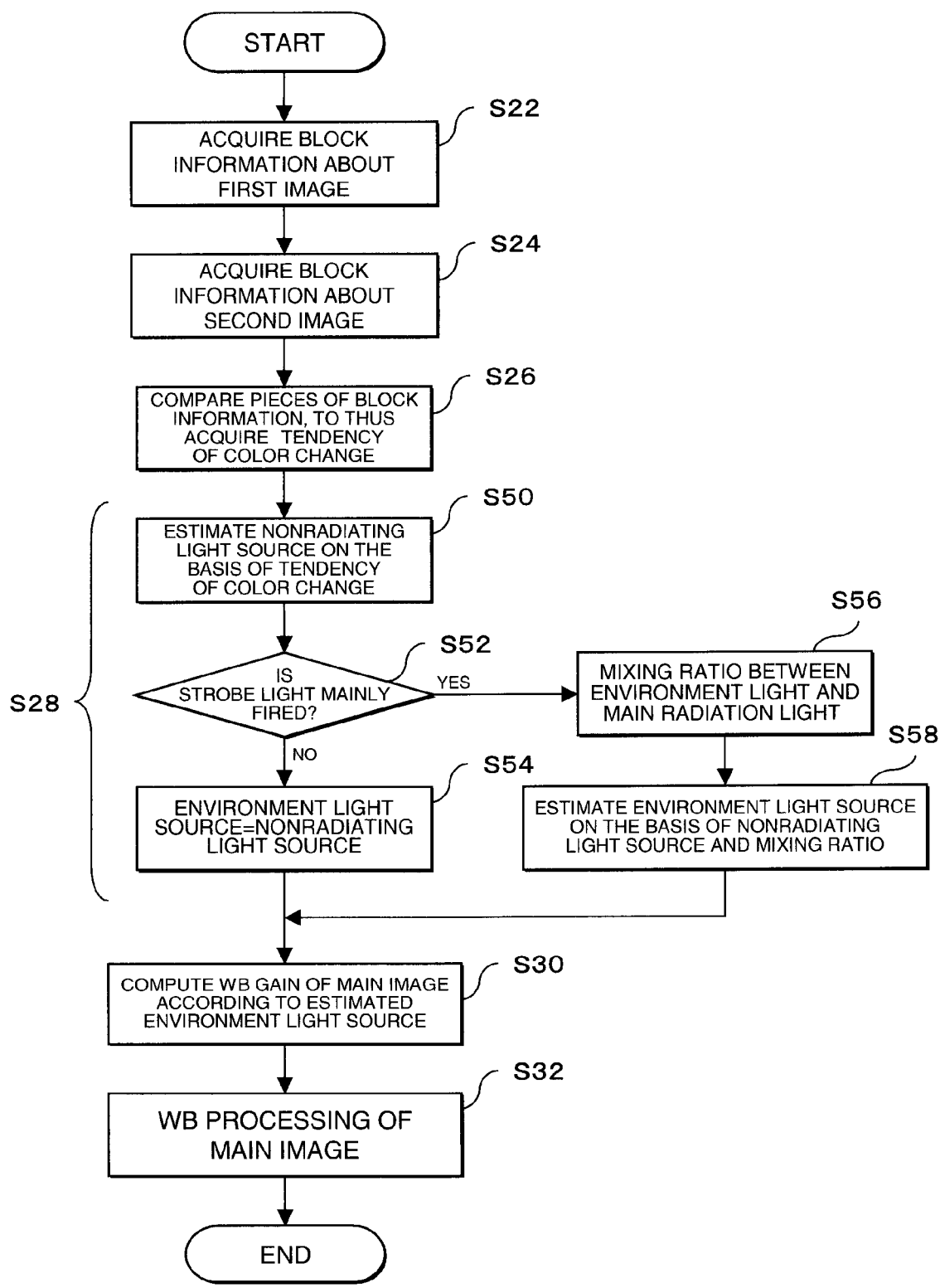
FIG. 16 is a flowchart showing the flow of AWB processing according to a third embodiment.

A third embodiment will now be described by reference to FIG. 16. FIG. 16 is a flowchart showing the flow of AWB processing employed in the third embodiment. In the third embodiment, the mode for estimating an environment light source is changed according to firing/nonfiring of a strobe light (actual illumination) during capture of a main image. In the present specification, the term "environment light source" signifies the environment light source employed during capture of a main image. Consequently, when a strobe light is fired during capture of a main image, the term "environment light source" signifies mixed light formed from a combination of the light source used during non-illumination and a strobe light fired for actual illumination. In the present embodiment, estimating the white-colored article color range of the mixed light is taken as estimation of an "environment light source" during capture of a main image. This will be described in detail hereunder.

In the present embodiment, as in the case of the first embodiment, block information is acquired from the first image data and the second image data, and the tendency of a color change is determined by comparison of these pieces of block information (S22 to S26). A tentative environment light source is estimated from the thus-obtained tendency of a color change (S50). Here, the tentative environment light source can be said to be the result of estimation of an environment light source employed for nonillumination (hereinafter called "nonillumination light source").

Subsequently, a determination is made as to whether or not actual illumination has been fired (S52). In normal times, a determination is made as to whether or not actual illumination is fired is determined according to a command from the user or environment brightness. Consequently, on the basis of the result of a determination as to whether or not the user has issued a command for firing actual illumination or a result of a determination as to whether or not the environment brightness falls below a predetermined reference value, a determination can be made as to whether or not actual illumination has been fired.

When actual illumination is determined not to have been fired, the previously-described light source for nonillumination is taken as an actual environment light source (S54). Computing an AWB gain and multiplying the AWB gain are performed on the basis of the thus-obtained environment light source (S30, S32).

In the meantime, when actual illumination is determined to have been fired, a mixing ratio M between the light source for nonillumination and the strobe light for actual illumination is determined (S56). The mixing ratio M is determined by an equation of M=(the degree of influence on preliminary illumination)×{(the quantity of actual illumination)×(the quantity of preliminary illumination)}/{(the quantity of exposure of a main image)×(the quantity of exposure of a second image data)}. The term "degree of influence on preliminary illumination" refers to a ratio of preliminary illumination brightness Pev to environment brightness Eev, which have been described in connection with the second embodiment.

On the basis of the type of light source for nonillumination and the mixing ratio M, which have been acquired as above, the white-colored article color range of the environment light source during capture of a main image; i.e., during actual illumination, is determined (S58). The color of a strobe light is usually known, and hence the white-colored article color range of strobe light can be said to be known. As the mixing ratio M of actual illumination becomes greater, the white-colored article color range of the environment light source acquired during actual illumination more closely approaches the white-colored article color range of strobe light. In contrast, as the mixing ratio of actual illumination becomes smaller, the white-colored article color range of the environment light source more closely approaches the white-colored article color range of the light source employed during nonillumination. In the present embodiment, the white-colored article color range of the environment light source achieved during actual illumination is determined by utilization of the above-described principle.

Figure 17:
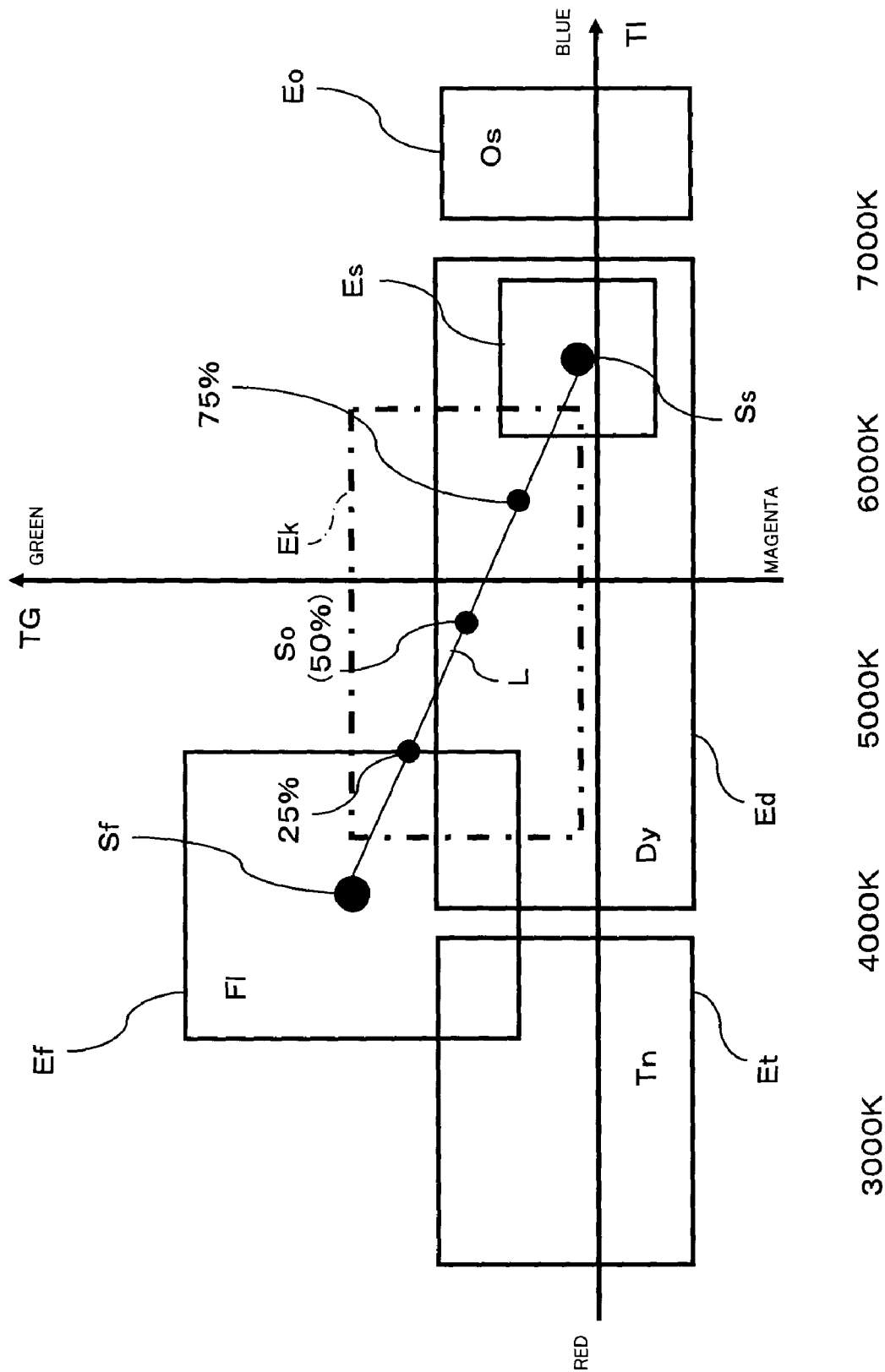
FIG. 17 is a view for describing the way to acquire the white-colored article color range during main illumination.

FIG. 17 is a view showing estimation of a white-colored article color range Ek of the environment light source performed when the tentative environment light source is fluorescent light. In the present embodiment, a reference point Ss in the white-colored article color range Es of strobe light is now determined. The reference point is taken as a mean coordinate point in the white-colored article color range Es. Subsequently, a reference point Sf in the white-colored article color range Ef of the light source for nonillumination; i.e., fluorescent light Ef in the embodiment shown in FIG. 17, is determined. A connecting line L interconnecting the reference points Ss, Sf is determined. Subsequently, a point of division So, which is acquired when the connect line L is divided according to the mixing ratio, is determined. In FIG. 17, the mixing ratio is assumed to be 50%, and the point where the connection line L is divided in a proportion of 1:1 is taken as the point of division So. The white-colored article color range Ek of the environment light source achieved during actual illumination is specified chiefly on the basis of the thus-obtained point of division So. The size and shape (aspect ratio) of the white-colored article color range Ek of the environment light source during actual illumination may be fixed or changed as appropriate. For instance, the size and shape (aspect ratio) of the white-colored article color range Ek may be changed according to the mixing ratio or the type of the tentative environment light source. For example, as the mixing ratio becomes larger, the white-colored article color range Ek may be made smaller. Moreover, the white-colored article color range Ek may be given the size and shape determined by averaging the white-colored article color range (the rectangle Ef shown in FIG. 17) of the light source achieved during nonillumination and the white-colored article color range Es of strobe light.

When the white-colored article color range Ek of the environment light source for actual illumination has been determined, the AWB gain is determined on the basis of the white-colored article color range Ek and the main image (S30). Specifically, the main image is divided into a plurality of blocks, and a typical value of each of the blocks is determined. The degree of contribution of the environment light source, achieved during actual illumination, on the entire image is determined from the number of blocks at which the thus-determined typical values fall within the white-colored article color range Ek, thereby computing the AWB gain responsive to the degree of contribution. When the AWB gain has been determined, the data pertaining to the main image are multiplied by the AWB gain, and AWB processing is completed (S32).

As is evident from the above descriptions, in the present embodiment, the white-colored article color range Ek of the environment light source for actual illumination is determined on the basis of the mixing ratio between the environment light source for nonillumination (the light source for nonillumination) and the light for actual illumination. At this time, the environment light source for nonillumination is determined on the basis of the tendency of a color change. Consequently, the white-colored article color range Ek of the environment light source for actual illumination can be determined more accurately. Consequently, a more reliable AWB gain can be obtained.

Figure 18:
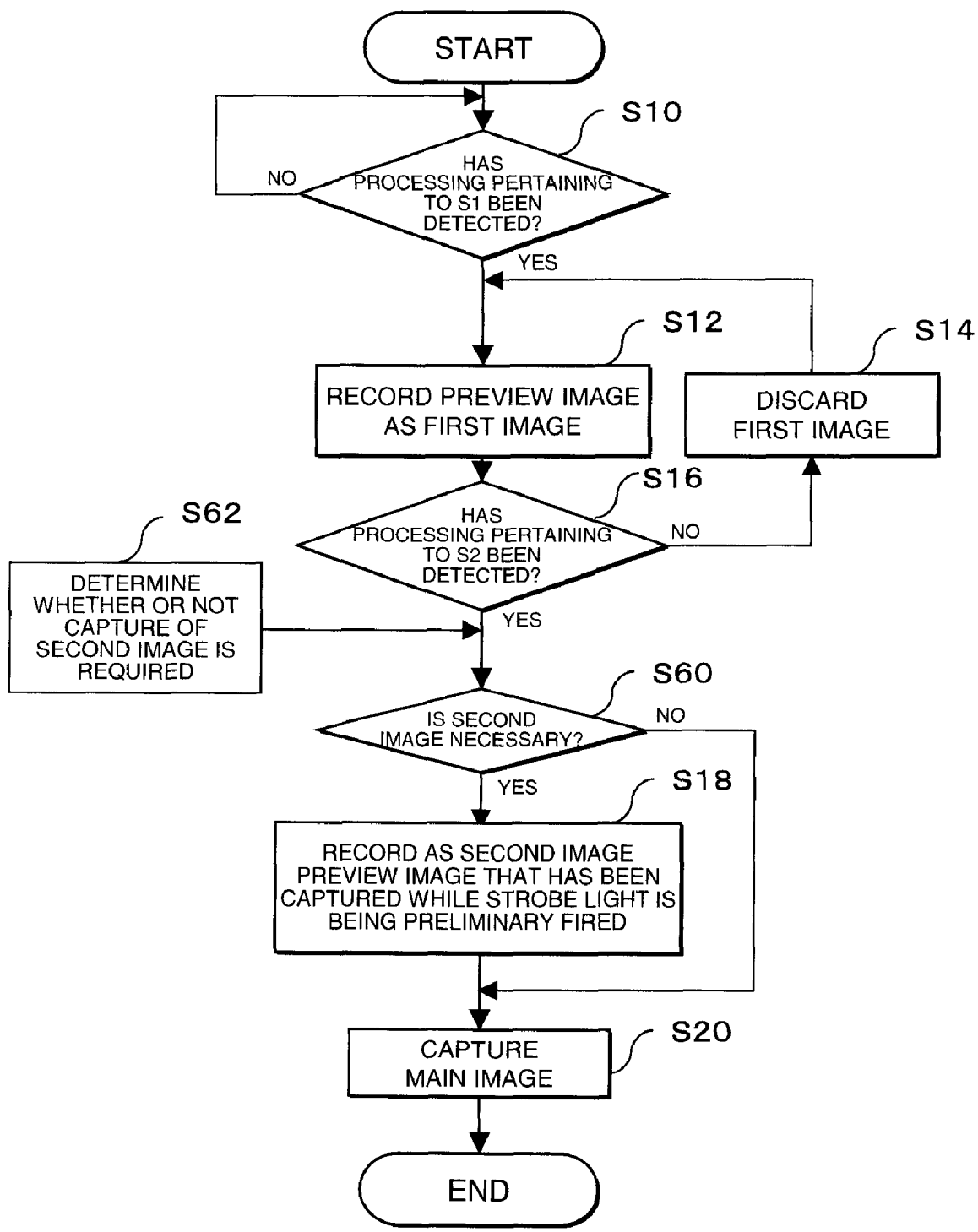
FIG. 18 is a flowchart showing the flow of photographing processing acquired in a fourth embodiment.
Figure 19:
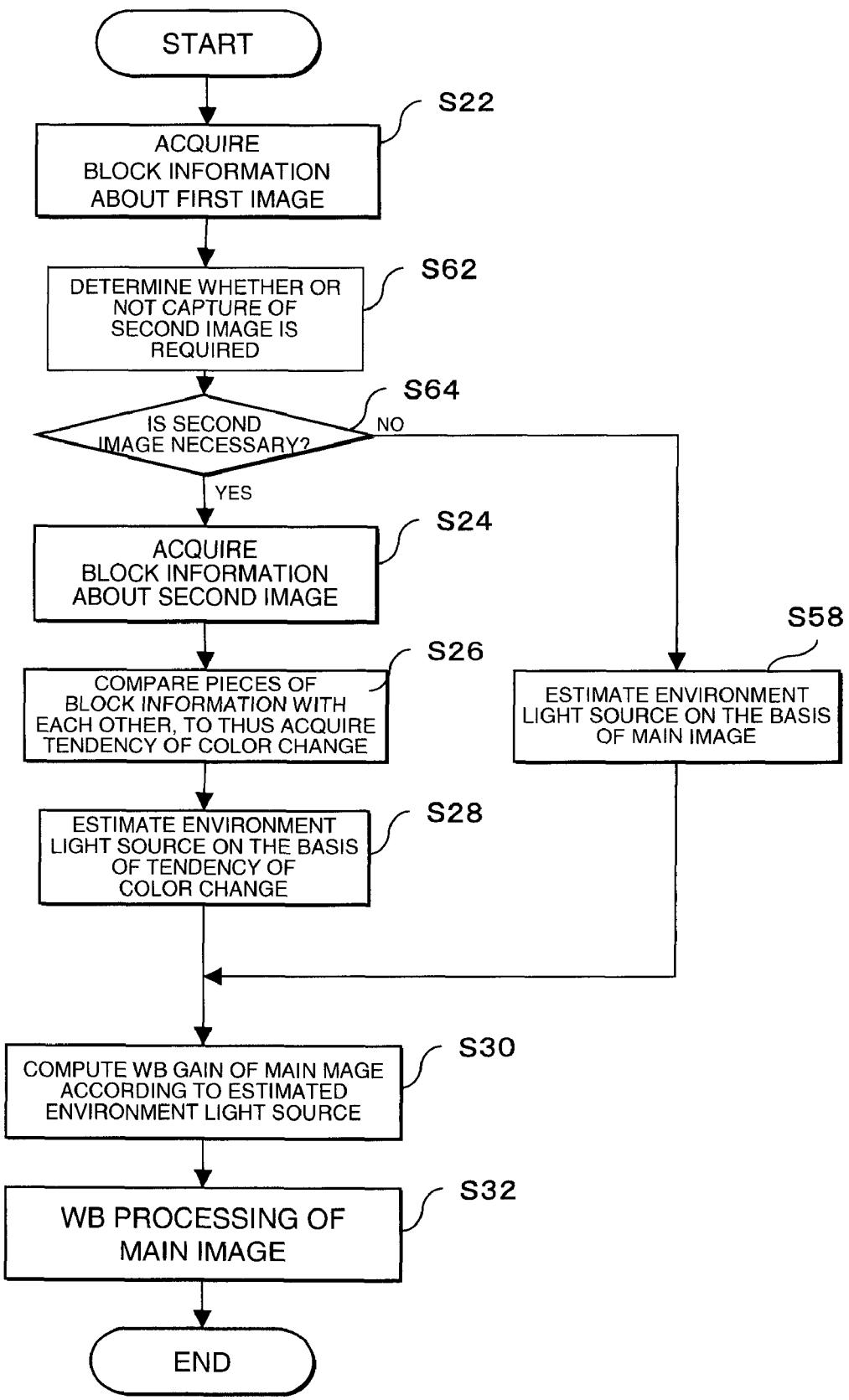
FIG. 19 is a flowchart showing the flow of AWB processing of the fourth embodiment.

Next, a fourth embodiment will be described by reference to FIGS. 18 and 19. FIG. 18 shows the flow of photographing processing employed in a fourth embodiment, and FIG. 19 is a flowchart showing the flow of AWB processing employed in the fourth embodiment.

In the fourth embodiment, a necessity for acquisition of a second image data; in other words, a necessity for preliminary illumination, is determined. When acquisition of the second image data is determined to be unnecessary, an environment light source is estimated on the basis of a main image as in the case of the conventional AWB processing technique. In contrast, when acquisition of the second image data is determined to be necessary, an environment light source is estimated in consideration of the tendency of a color change between the first and second image data, as in the case of the first to third embodiments. The fourth embodiment will be described in detail hereinbelow.

First, the flow of photographing processing employed in the present embodiment will be described. Even in the present embodiment, as in the case of the first embodiment, temporary recording and discarding of a preview image are repeated during a period from detection of the release switch S1 until detection of the release switch S2, to thus acquire a first image data (S10, S12, and S14). As will be described in detail later, a necessity for acquiring a second image data is determined on the basis of the first image data through AWB processing (S62, S64).

When acquisition of the second image data is determined to be necessary as a result of determination of a necessity, a preview image is acquired while preliminary illumination is fired, and the thus-acquired preview image is temporarily recorded as a second image data (S18). After acquisition of the second image data, a main image is photographed (S20). In the meantime, when acquisition of the second image data is determined to be unnecessary, a main image is photographed immediately after detection of the release switch S2 (S20).

Next, the flow of AWB processing performed in parallel with photographing processing will now be described by reference to FIG. 19. In the present embodiment, block information about the first image data is acquired (S22). The method for acquiring the block information is the same as that adopted in the first embodiment. Subsequently, a necessity for acquiring a second image data is determined (S62). This determination is made on the basis of whether or not the user is misled in any way by preliminary illumination and whether or not estimating an environment light source on the basis of the tendency of a color change is useful.

A conceivable case where the user is misled in any way by preliminary illumination is, e.g., a case where preliminary illumination is a result of failure of the camera. As is obvious from the descriptions provided thus far, preliminary illumination is carried out regardless of the user command or environment brightness. Put another way, preliminary illumination is carried out regardless of the user's intention or prediction. When such preliminary illumination is carried out, the user may erroneously believe that the camera has broken. Especially, when actual illumination is not fired during capture of a main image; i.e., when environment brightness is sufficiently bright and there is no command from the user, firing preliminary illumination is highly likely to mislead the user. For this reason, when actual illumination is not performed, a necessity for preliminary illumination and, by extension, a necessity for acquisition of a second image data, may also be determined to be unnecessary.

When estimating the environment light source on the basis of the tendency of a color change is determined to be useful, there is conceived a case where the degree of influence of preliminary illumination is sufficiently large. When the degree of influence of preliminary illumination is large, the result of estimation of the environment light source made on the tendency of a color change is said to be highly reliable and useful. Conversely, when the degree of influence of preliminary illumination is low, the result of estimation of the environment light source made on the tendency of a color change is said to be of little use. In short, when the degree of influence of preliminary illumination is low, a necessity for acquiring the tendency of a color change by acquiring a second image data is low. Consequently, when the degree of influence of preliminary illumination falls below a predetermined reference value, acquiring a second image data may be determined to be unnecessary.

When estimating the environment light source on the basis of the tendency of a color change is useful, there is conceived a case where the focuses subject space includes a lot of color ranges (the ovals A to C shown in FIG. 2), where the light source is likely to be erroneously determined. As described previously, when the subject includes a lot of color ranges, where the light source is likely to be erroneously determined, difficulty is encountered in accurately estimating the environment light source from only the main image. In such a case, estimating the environment light source on the basis of the tendency of a color change is said to be useful. Conversely, when the subject includes few color ranges where the light source is likely to be erroneously determined, an accurate environment light source can be estimated from only a main image. Consequently, on the basis of the block information about the first image data, proportions of the blocks in the first image data, which fall within the color range where the light source is likely to be erroneously determined, is determined. When the number of blocks, where an erroneous determination is likely to be made, is small, acquiring a second image data may be determined to be unnecessary.

In the present embodiment, a necessity for acquiring a second image data is determined on the basis of the various standards described above and a combination thereof. When acquiring a second image data is determined to be necessary, the second image data is acquired. Further, the tendency of a color change between first and second image data is acquired (S24, S26). An environment light source is estimated on the basis of the thus-acquired tendency of a color change (S28). The techniques of the first through third embodiments are utilized for estimating the environment light source. Specifically, as necessary, the environment light source is estimated in consideration of the degree of influence of preliminary illumination, a mixing ratio for actual illumination, and the like, as well as the tendency of a color change. In the meantime, when acquiring a second image data is determined to be unnecessary, an environment light source is estimated on the basis of a main image as in the case of conventional AWB processing (S58).

When the environment light source has been estimated, the degree of contribution of the environment light source to the entire main image is determined, and an AWB gain responsive to the degree of contribution is computed (S30). By means of multiplying the data pertaining to the main image by the AWB gain, AWB processing is completed (S32).

As is evident from the above descriptions, in the present embodiment, necessity of acquiring a second image data is determined. According to the result of determination, the mode for estimating the environment light source is changed. Thereby, an environment light source can be accurately estimated while preventing misleading of the user or unnecessary preliminary illumination.

In each of the first through fourth embodiments, the preview image is taken as the first and second image data. However, a main image may be taken as first and second image data. Specifically, when a main image is photographed while firing actual illumination, a preview image captured without firing preliminary illumination may be taken as a first image data; the main image may be taken as the second image data; and an environment light source may be estimated on the basis of the tendency of a color change between the main image and the first image data. Conversely, when a main image is photographed without firing actual illumination, a preview image taken while firing preliminary illumination is taken as a second image data, and the main image is taken as a first image data. An environment light source is estimated on the basis of the tendency of a color change between the main image and the second image data. However, in many cases, unlike the main image, an ordinary preview image is not subjected to noise removal processing, or the number of pixels of the preview image differs from that of the main image. In other words, the main image and the preview image differ from each other in terms of quality. The tendency of a color change between the images, which differ in quality from each other, leads to a drop in the accuracy of estimation of an environment light source. Accordingly, when the main image is taken as the first image data or the second image data, the second image data or the first image data, which is the preview image, is desirably matched with the main image in terms of quality.

In each of the first through fourth embodiments, the first and second image data are captured prior to the main image. However, the first and second image data may be captured after the main image, so long as essentially the same subject as that of the main image can be photographed.

The invention has been described in detail with particular reference to certain preferred embodiments thereof, but it will be understood that variations and modifications can be effected within the spirit and scope of the invention.

PARTS LIST

10 Digital camera
12 Diaphragm member
14 Lens
16 CCD
18 Double correction sampling circuit (CDS)
20 Amplifying circuit (AMP)
22 Analog-to-digital (A/D) converter
24 Image memory
25 Image processing section
26 RGB separation section
28 WB processing section
30 γ correction section
32 Color correction section
34 LCD
36 Timing generator (TG)
38 Memory controller
40 Image memory
42 Compression-and-expansion circuit
44 Recording medium
46 Strobe
48 CPU
50 AE/AF/strobe control section
51 WB gain acquisition section
  Parts List cont'd
52 Block information acquisition section
54 Environment light source estimation section
56 Gain-computing section
58 Operation section
S10 Processing pertaining to S1 been detected
S12 Record preview image as first image data
S14 Discard first image
S18 Record second image preview image
S20 Main image captured
S22 Acquire block information about first image
S24 Acquire block information about second image
S26 Compare block information of first and second images to acquire tendency of color change
S28 Estimated environment light source based on tendency of color change
S30 Compute estimated degree of environment light source to entire main image
S32 WB processing complete
S34 Tentative environment light source estimated on thus-obtained tendency of color change
S36 Determine degree of influence of preliminary illumination
S38 Determine whether degree of influence is equal to or higher than predetermined reference value
  Parts List cont'd
S40 Tentative environment light source is determined as environment light source used for computing AWB gain
S42 Acquire block information for main image
S44 Calculate blocks of main image according to type of light source
S46 Weigh coefficients of type of light sources based on tentative environment light source
S48 Light source yielding greatest product determined to be environment light source
S50 Estimate nonradiating light source on the basis of tendency of color change
S52 Determine whether or not actual illumination has been fired
S54 Environment light source equals non-illuminated light source
S56 Mixing ratio between light source for non-illumination and strobe light Illumination is determined
S58 White-colored article color range of environment light source during capture of main image is determined
S62 Determine whether second image data is required
S64 Is second image necessary

The invention claimed is:

1. A digital camera for subjecting a main image, which is a user's intended captured image, to white balance processing, the camera comprising:
  first image acquisition means for acquiring a first image data by means of capturing a subject image identical with that of the main image, without firing a strobe light for preliminary illumination;
  second image acquisition means for acquiring a second image data by means of capturing a subject image identical with that of the main image while firing a strobe light for preliminary illumination;
  data acquisition means which divides each of the first and second image data into a plurality of blocks and acquires, as block information, a typical color value of each of the blocks and the type of a light source of each of the blocks, and acquires a tendency of a color change on the basis of a comparison between the acquired block information about the first image data and the acquired block information about the second image data;
  environment light source estimation means for estimating an environment light source of the subject on the basis of at least the acquired tendency of a color change; and
  gain-computing means for computing a white balance gain of the main image in accordance with the estimated environment light source.

2. The digital camera according to claim 1, wherein the data acquisition means acquires, as the tendency of a color change, proportions of number of blocks where the types of the light sources have changed from the first image data to the second image data and the types of the light sources acquired before and after occurrence of the changes.

3. The digital camera according to claim 1, wherein the data acquisition means acquires, as the tendency of a color change, amounts of changes between the first and second image data in connection with the typical value of a block at identical coordinates.

4. The digital camera according to claim 1, wherein the data acquisition means acquires, as the tendency of a color change, a difference in the number of blocks between the first and second image data for each light source type.

5. The digital camera according to claim 1, further comprising:
  means for determining whether or not a strobe light is mainly illuminated during capture of a main image, wherein, when the strobe light is determined to be mainly illuminated, the environment light source estimation means estimates an environment light source for nonillumination on the basis of the tendency of a color change; determines a mixing ratio of the environment light source acquired during nonillumination to the strobe light fired for actual illumination; and estimates an environment light source employed during acquisition of a main image on the basis of the obtained mixing ratio and the environment light source used during nonillumination.

6. The digital camera according to claim 1, wherein the environment light source estimation means has degree-of-influence acquisition means for determining the degree of influence of preliminary illumination on a subject; and, when the degree of influence falls below a predetermined reference value, an environment light source is estimated on the basis of an acquired degree of influence and the tendency of a color change.

7. The digital camera according to claim 6, wherein the degree-of-influence acquisition means determines a degree of influence of preliminary illumination on the basis of at least a proportion between brightness of the subject and brightness of preliminary illumination in the focused subjected space.

8. The digital camera according to claim 6, wherein the degree-of-influence acquisition means determines the degree of influence of preliminary illumination on the basis of at least amounts of changes in brightness value between the first and second image data.

9. The digital camera according to claim 6, wherein, when the degree of influence of preliminary illumination falls below a predetermined reference value,
  the environment light source estimation means estimates a tentative environment light source on the basis of the tendency of a color change; determines weighting coefficients of respective types of light sources on the basis of the obtained tentative environment light source; divides a main image into a plurality of blocks; determines a typical color value of each of the blocks and a type of light source of each of the blocks; and estimates an environment light source on the basis of a value which has been determined by multiplying the number of blocks in the main image for each of the types of the light sources by the weighting coefficient responsive to the type of the light source.

10. The digital camera according to claim 6, wherein, when the degree of influence of preliminary illumination falls below a predetermined reference value,
  the environment light source estimation means estimates a tentative environment light source on the basis of the tendency of a color change; sets an area, which is determined by removing areas where a light source is likely to be erroneously determined, as a white-colored article color range achieved under a light source differing from the tentative environment light source; divides a main image into a plurality of blocks; determines a type of a light source of each of the blocks on the basis of the set white-colored article color range; and estimates an environment light source on the basis of a result of determination of a light source type made for each of the blocks.

11. The digital camera according to claim 1, further comprising:
  second image data necessity determination means for determining whether or not acquiring a second image data is necessary; and, when acquiring a second image data is determined to be unnecessary, acquiring a second image data and acquiring the tendency of a color change are not performed; and
  the environment light source estimation means estimates an environment light source on the basis of a main image.

12. The digital camera according to claim 11, wherein the second image data necessity determination means determines whether or not acquiring a second image data is necessary, on the basis of at least firing/nonfiring of a strobe light for illumination during capture of a main image.

13. The digital camera according to claim 11, wherein the second image data necessity determination means determines whether or not acquiring a second image data is necessary, on the basis of at least proportions of color areas, included in the first image data, where a light source is likely to be erroneously determined.

14. The digital camera according to claim 12, wherein the second image data necessity determination means determines whether or not acquiring a second image data is necessary, on the basis of the degree of influence of preliminary illumination on the subject.

15. The digital camera according to claim 1, wherein the first image data and the second image data correspond to a preview image displayed on an electronic finder as a photographable image.

* * * * *